(12) United States Patent
Yoshida et al.

(10) Patent No.: US 8,021,579 B2
(45) Date of Patent: Sep. 20, 2011

(54) CONDUCTIVE COMPOSITION AND PRODUCTION METHOD THEREOF, ANTISTATIC COATING MATERIAL, ANTISTATIC COATING, ANTISTATIC FILM, OPTICAL FILTER, AND OPTICAL INFORMATION RECORDING MEDIUM, AND CAPACITORS AND PRODUCTION METHOD THEREOF

(75) Inventors: Kazuyoshi Yoshida, Kazo (JP); Tailu Ning, Saitama (JP); Yasushi Masahiro, Saitama (JP); Rika Abe, Saitama (JP); Yutaka Higuchi, Saitama (JP)

(73) Assignee: Shin-Etsu Polymer Co., Ltd. (JP)

( * ) Notice: Subject to any disclaimer, the term of this patent is extended or adjusted under 35 U.S.C. 154(b) by 0 days.

(21) Appl. No.: 12/909,435

(22) Filed: Oct. 21, 2010

(65) Prior Publication Data

US 2011/0033651 A1 Feb. 10, 2011

Related U.S. Application Data

(62) Division of application No. 11/244,604, filed on Oct. 6, 2005, now Pat. No. 7,842,196.

(30) Foreign Application Priority Data

| Oct. 8, 2004 | (JP) | 2004-296380 |
| Nov. 22, 2004 | (JP) | 2004-337469 |
| Dec. 1, 2004 | (JP) | 2004-348686 |
| Mar. 15, 2005 | (JP) | 2005-072757 |
| Mar. 15, 2005 | (JP) | 2005-072758 |
| Mar. 17, 2005 | (JP) | 2005-076972 |

(51) Int. Cl.
*H01B 1/12* (2006.01)
*G11B 7/252* (2006.01)

(52) U.S. Cl. ........... 252/500; 369/93; 369/100; 430/507
(58) Field of Classification Search ............ 252/500, 252/589; 369/275.1, 93, 100; 359/885; 430/507
See application file for complete search history.

(56) References Cited

U.S. PATENT DOCUMENTS 4,898,921 A * 2/1990 Humphrey et al. ........... 527/300
(Continued)

FOREIGN PATENT DOCUMENTS

EP 1 324 124 7/2003
(Continued)

OTHER PUBLICATIONS

Office Action mailed Nov. 30, 2010 in corresponding Japanese Patent Application No. 2005-072758 (with English language translation).
(Continued)

*Primary Examiner* — Mark Kopec
(74) *Attorney, Agent, or Firm* — Ostrolenk Faber LLP

(57) ABSTRACT

A conductive composition comprises a π conjugated conductive polymer, a polyanion, and a hydroxy group-containing aromatic compound containing two or more hydroxy groups. An antistatic coating material comprises the conductive composition and a solvent. An antistatic coating is produced by applying the antistatic coating material. A capacitor comprises an anode composed of a porous valve metal body; a dielectric layer formed by oxidizing a surface of the anode; and a cathode formed on the dielectric layer, wherein the cathode has a solid electrolyte layer comprising the conductive composition.

5 Claims, 2 Drawing Sheets

U.S. PATENT DOCUMENTS

| | | | |
|---|---|---|---|
| 5,766,515 | A | 6/1998 | Jonas et al. |
| 5,783,111 | A | 7/1998 | Ikkala et al. |
| 5,866,043 | A | 2/1999 | Ikkala et al. |
| 6,324,051 | B1 | 11/2001 | Igaki et al. |
| 6,391,379 | B1 | 5/2002 | Lessner et al. |
| 6,594,141 | B2 | 7/2003 | Takada |
| 6,850,406 | B2 | 2/2005 | Asami et al. |
| 2001/0012867 | A1 | 8/2001 | Angelopoulos et al. |
| 2002/0022191 | A1 | 2/2002 | Lamotte et al. |
| 2003/0193042 | A1 | 10/2003 | Go et al. |
| 2006/0202169 | A1 | 9/2006 | Tseng et al. |

FOREIGN PATENT DOCUMENTS

| | | | |
|---|---|---|---|
| JP | 63-158829 | | 7/1988 |
| JP | 63-173313 | | 7/1988 |
| JP | 01-254764 | | 10/1989 |
| JP | 3-504872 | | 10/1991 |
| JP | 3-222207 | | 11/1991 |
| JP | 05-021281 | | 1/1993 |
| JP | 6-313038 | | 11/1994 |
| JP | 07-105718 | | 4/1995 |
| JP | 07-126384 | | 5/1995 |
| JP | 07-165892 | | 6/1995 |
| JP | 08-231862 | | 9/1996 |
| JP | 2636968 | | 4/1997 |
| JP | A-10-032145 | | 2/1998 |
| JP | A-10-092699 | | 4/1998 |
| JP | 10-241998 | | 9/1998 |
| JP | 11-074157 | | 3/1999 |
| JP | A-2000-340462 | | 12/2000 |
| JP | 2003-022938 | | 1/2003 |
| JP | 2003-037024 | | 2/2003 |
| JP | 2003-261749 | | 9/2003 |
| JP | 2003-264127 | | 9/2003 |
| JP | 2004-523623 | | 8/2004 |
| JP | 2004-532307 | | 10/2004 |
| JP | 2004-533519 | | 11/2004 |
| JP | 2006-265297 | | 10/2006 |
| WO | WO 90/01775 | | 2/1990 |
| WO | WO 02/079316 | | 10/2002 |
| WO | WO 03/001299 | | 1/2003 |
| WO | WO 2004/018544 | | 3/2004 |
| WO | WO 2004/018560 A1 | | 3/2004 |
| WO | WO2004/084205 | * | 9/2004 |
| WO | WO 2004/113441 | | 12/2004 |

OTHER PUBLICATIONS

Japanese Office Action for Japanese Application No. JP 2005-072757 mailed on Mar. 16, 2010.

Japanese Notice of Allowance in corresponding Japanese Patent Application No. 2005-072757 dated Sep. 21, 2010 (with English language translation).

Japanese Office Action dated Oct. 7, 2005 and translation.

"Fine Chemical Antistatic Agents Lastest Market Trend (the first volume)," vol. 16, No. 15, 1987, p. 24-36, published by CMC.

European Search Report issued Jul. 31, 2007.

Kim W. H., et al., "Molecular OLEDs using highly conductive and transparent polymeric anodes", Proceedings of the SPIE, SPIE, Bellingham, VA, US, vol. 4464, pp. 85-92 (2002).

Office Action mailed Mar. 1, 2011 in counterpart U.S. Appl. No. 12/909,449.

Japanese Office Action mailed Jun. 14, 2011 in corresponding Japanese Patent Application No. 2005-076972 (with English-language translation).

* cited by examiner

CONDUCTIVE COMPOSITION AND PRODUCTION METHOD THEREOF, ANTISTATIC COATING MATERIAL, ANTISTATIC COATING, ANTISTATIC FILM, OPTICAL FILTER, AND OPTICAL INFORMATION RECORDING MEDIUM, AND CAPACITORS AND PRODUCTION METHOD THEREOF

CROSS-REFERENCE TO RELATED APPLICATIONS

The present application is a divisional of U.S. patent application Ser. No. 11/244,604 filed on Oct. 6, 2005, now U.S. Pat. No. 7,842,196, which claims priority of Japanese Patent Application Nos. 2004-296380, filed on Oct. 8, 2004, 2004-337469, filed on Nov. 22, 2004, 2004-348686, filed on Dec. 1, 2004, 2005-072757, filed on Mar. 15, 2005, 2005-072758 filed on Mar. 15, 2005 and 2005-076972, filed on Mar. 17, 2005, the entire contents of which are hereby incorporated by reference.

BACKGROUND OF THE INVENTION

1. Field of the Invention

The present invention relates to a conductive composition containing a π conjugated conductive polymer and production method thereof. The present invention further relates to an antistatic coating material for imparting antistatic properties to a film, an antistatic coating material having antistatic properties, an antistatic film used in wrapping materials of food and electronic parts, an optical filter used for the front surface of a liquid crystal display and a plasma display, and an optical information recording medium, such as CDs and DVDs. The present invention relates to capacitors such as an aluminum electrolytic capacitor, tantalum electrolytic capacitor, and niobium electrolytic capacitor and a production method thereof.

2. Description of Related Art

π conjugated conductive polymers are known as organic conductive materials. The π conjugated conductive polymers is generally referred to an organic polymer composed of the main chain of a conjugated system, and examples of the π conjugated conductive polymers include polypyrroles, polythiophenes, polyacetylenes, polyphenylenes, polyphenylene vinylenes, polyanilines, polyacenes, polythiophene vinylenes, and copolymers thereof. These π conjugated conductive polymers are usually synthesized by an electrolytic polymerization method or a chemical oxidative polymerization method.

In the electrolytic polymerization method, a previously prepared base such as an electrode material is immersed in a mixed solution of an electrolyte as a dopant and precursor monomers for constituting a π conjugated conductive polymer to form a film of the π conjugated conductive polymer on the base. Therefore, mass production is very difficult.

On the other hand, there are no such limitations on the chemical oxidative polymerization method. A large amount of a π conjugated conductive polymer can be produced in a solution by adding oxidant and oxidation polymerization catalysis to precursor monomers of the π conjugated conductive polymer.

However, the π conjugated conductive polymer is obtained as an insoluble solid powder in the chemical oxidative polymerization method because the polymer becomes less soluble in a solvent as the conjugated system of the main chain of the polymer grows. It is difficult to form a uniform film of a π conjugated conductive polymer on a base surface if the polymer is insoluble. Additionally, the π conjugated conductive polymer tends to be an amorphous block and then a conductive composition containing the π conjugated conductive polymer has low conductivity.

Therefore, some methods to solubilize the π conjugated conductive polymers have been attempted. They are a method of introducing a functional group into the polymers, a method of dispersing the polymers in a binder resin, and a method of adding an anion group-containing polymeric acid to the polymer.

For example, a method of preparing an aqueous solution of poly(3,4-dialkoxythiophene) by the chemical oxidative polymerization of 3,4-dialkoxythiophene using oxidant in the presence of polystyrene sulfonic acid, which is an anion group-containing polymeric acid having a molecular weight of 2000 to 500000, in order to improve the dispersibility in water, is disclosed in Japanese Patent Publication No. 2636968. A method of preparing an aqueous colloid solution of a π conjugated conductive polymer by chemical oxidative polymerization of a precursor monomer of the polymer in the presence of polyacrylic acid, is disclosed in Japanese Unexamined Patent Application, First Publication No. 7-165892.

According to methods disclosed in Japanese Patent Publication No. 2636968 and Japanese Unexamined Patent Application, First Publication No. 7-165892, an aqueous dispersion solution containing a π conjugated conductive polymer can be easily prepared. These methods require a π conjugated conductive polymer to contain a large amount of anion group-containing polymeric acid for ensuring its dispersibility. Therefore, the problem occurs that the obtained conductive compositions contain a large amount of compounds which do not contribute to conductivity, making it difficult to achieve high conductivity.

In the chemical oxidative polymerization method, high oxidative oxidants cause unfavorable side reactions in high probability during chemical oxidative polymerization. Therefore, polymer structures having poor conjugated properties may be produced, the produced polymer may be excessively oxidized, or impurity ions may remain in the obtained polymer, causing low conductivity and long-term stability of the obtained π conjugated conductive polymer. In addition, since the π conjugated conductive polymer is a highly oxidized state, it is considered that radicals will be formed by oxidative degradation of a portion of the polymer due to the external environment such as heat, and then degradation progresses according to a radical chain reaction.

Resin films themselves are insulators and easily electrically charged. Furthermore, resin films tend to charge static electricity by friction or the like. Moreover, static electricity is not easily removed, but rather accumulates causing various problems.

Particularly, when a resin film is used for food packaging material emphasizing sanitary properties, dust and dirt are absorbed in display, the appearance is significantly impaired and in some cases the commodity value is lowered. When resin film is used for packaging a powder, charged powder is absorbed or repulsed in its packaging or use, and therefore causes the inconvenience that handling of the powder becomes difficult. When a precision electronic part is packaged with a resin film, it is a feared that the precision electronic part is damaged by the static electricity; therefore, the occurrence of static electricity must always be prevented.

Moreover, it is desirable that the surface of an optical filter or an optical information recording medium has high hardness and high transparency as well as antistatic properties to prevent the adherence of dust and dirt due to the static electricity. Particularly, it is desired that the surface resistance of the antistatic property be in the region of about $10^6$ to $10^{10}\Omega$ and that the resistance stabilizes (i.e., stabilized antistatic properties), from which antistatic coating having antistatic properties and high hardness is provided on the surface of optical filter or optical information recording medium. In order to impart antistatic properties, for example, a method for coating a resin film or a surfactant on the surface and a method for kneading a surfactant into a resin forming a resin film or an antistatic coating have been adopted (for example, see "Fine Chemical Antistatic Agents Latest Market Trend (the first volume)," Vol. 16, No. 15, 1987, p. 24-36, published by CMC).

However, electrostatic prevention based on this surfactant has the drawback that its conduction mechanism is one of ion conduction, therefore, it is easily affected by humidity, conductivity increases by high humidity; however, conductivity decreases by low humidity. Therefore, the antistatic function deteriorates and antistatic performance is not displayed as necessary in an environment where the humidity is low, and especially static electricity easily occurs.

If a metal or carbon with electron conduction as conduction mechanism is used, such humidity dependence disappears, but these materials are totally opaque and not applicable for purposes requiring the transparency.

Moreover, a metal oxide such as ITO (Indium Tin Oxide) has transparency and adopts the electron conduction as a conduction mechanism; therefore, it is suited in this respect, but a process using a sputtering apparatus must used for its film-forming Not only is the process complicated but also the manufacturing cost rises. A coating film of inorganic metal oxide has low flexibility. When a film is formed on a thin base film, the coating film may be broken and does not exhibit conductivity. In addition, it is feared that peeling occurs at the interface and the transparency reduces because the adhesion to the base being an organic substance is low.

Moreover, π conjugated conductive polymers are known as organic materials with electron conduction as the conduction mechanism, but the π conjugated conductive polymers generally have insoluble and infusible properties, and it is difficult to coat the polymers on a base film after polymerization. Accordingly, it has been attempted that aniline be polymerized in the presence of a polymeric acid with a sulfo group (polyanion) to form a water-soluble polyaniline, the obtained mixture is used, coated on a base film and then dried (e.g., see Japanese Unexamined Patent Application, First Publication No. 1-254764).

However, as with the method described in Japanese Unexamined Patent Application, First Publication No. 1-254764, if aniline is directly polymerized on a base, an antistatic coating can be formed. In this case, the antistatic coating has low conductivity because the coating is not obtained by a π conjugated conductive homopolymer, and the adhesion to a resin base is low and manufacturing processes are also complicated because the antistatic coating is water-soluble.

Capacitors are given as example of using the π conjugated conductive polymers.

In recent years, it has been required to reduce the impedance of capacitors used for electronics in a high-frequency region with the digitalization of electronics. A so-called functional capacitor in which an oxide film of valve metals such as aluminum, tantalum, and niobium is adopted as a dielectric and a π conjugated conductive polymer is formed on this surface and used as a cathode and thus far has been used in response to this requirement.

As shown in Japanese Unexamined Patent Application, First Publication No. 2003-37024, it is general that the structure of this functional capacitor has an anode consisting of a porous valve metal body, a dielectric layer formed by oxidizing the surface of anode, and a cathode obtained by laminating a solid electrolyte layer, a carbon layer and a silver layer on the dielectric layer. The solid electrolyte layer of the capacitor is a layer constructed from a π conjugated conductive polymer of pyrrole, thiophene, and the like, and the layer performs to penetrate into the inside of porous body, come into contact with a larger area of electrolyte layer to derive a high capacity, restore defects of the dielectric layer, and prevent leakage of a current.

An electrolytic polymerization method (see Japanese Unexamined Patent Application, First Publication No. 63-158829) and a chemical oxidative polymerization method (see Japanese Unexamined Patent Application, First Publication No. 63-173313) have been widely known as methods for forming the π conjugated conductive polymers.

However, the electrolytic polymerization method has the problem that a conductive layer made of manganese oxide must be formed on the surface of the porous valve metal body beforehand, the process is complicated, and further the manganese oxide has low conductivity and weakens the effect of using the π conjugated conductive polymers having high conductivity.

The chemical oxidative polymerization method has the problem that the polymerization time is long, the polymerization must be repeated to ensure the thickness, the production efficiency of capacitors is low and the conductivity is also low.

Accordingly, a method wherein conductive polymers are not formed by the electrolytic polymerization method and the chemical oxidative polymerization method (see Japanese Unexamined Patent Application, First Publication No. 7-105718) has been proposed. A method comprising the steps of polymerizing aniline while allowing a polymeric acid with a sulfo group or carboxy group to coexist to prepare a water-soluble polyaniline, applying the aqueous solution of polyaniline on a dielectric layer, and then drying has been described in Japanese Unexamined Patent Application, First Publication No. 7-105718. This method is simple, but the permeability for the inside of porous body of the polyaniline solution deteriorates, the conductivity is low because the polymeric acid other than the π conjugated conductive polymer is contained and the humidity dependence on conductivity by the effect of polymeric acid may also be observed.

A capacitor having a low equivalent series resistance (ESR) as index of impedance has been desired, and the conductivity of the solid electrolyte layer must be increased to decrease ESR. As a method for increasing the conductivity of the solid electrolyte layer, for example, it has been proposed to highly control conditions for the chemical oxidative polymerization method (see Japanese Unexamined Patent Application, First Publication No. 11-74157). However, in the production method, the complex chemical oxidative polymerization method is more complicated in many cases, thus the simplification and low costing of processes cannot be realized.

SUMMARY OF THE INVENTION

The first object of the present invention is to provide a conductive composition excellent in all of electric conductivity, solvent solubility and heat stability and production method thereof.

The second object of the present invention is to provide an antistatic coating material which can form an antistatic coating having high conductivity, flexibility, and adhesion to base, an antistatic coating which can be prepared by a simple production method of coating, and an antistatic film, an optical filter, and an optical information recording medium which all have excellent antistatic property.

Furthermore, the third object of the present invention is to provide a capacitor having excellent conductivity of solid electrolyte layer of cathode and a low ESR, and a method of producing the capacitor in a simple manner.

A conductive composition of the present invention comprises a π conjugated conductive polymer, a polyanion, and a hydroxy group-containing aromatic compound containing two or more hydroxy groups.

In the conductive composition of the present invention, the hydroxy group-containing aromatic compound may be represented by the following formula (1):

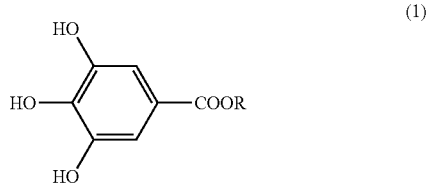

(wherein in formula (1), R represents a group selected from a linear or branched alkyl group, an alkenyl group, a cycloalkenyl group, an aryl group, or an aralkyl group, each having 1 to 15 carbon atoms.)

In the conductive composition of the present invention, the hydroxy group-containing aromatic compound may contain a sulfo group and/or a carboxy group.

The conductive composition according to the present invention may further comprise a dopant.

The conductive composition of the present invention may further comprise a binder resin.

The binder resin may be at least one selected from the group consisting of polyurethane, polyester, acryl resin, polyamide, polyimide, epoxy resin, and polyimide silicone.

A production method of a conductive composition of the present invention comprises: a polymerization step for dispersing or dissolving a precursor monomer, which forms a π conjugated conductive polymer, in a solvent, and polymerizing the precursor monomer in a presence of a polyanion by a chemical oxidative polymerization, and an addition step for adding a hydroxy group-containing aromatic compound containing two or more hydroxy groups.

The production method of the conductive composition of the present invention may further comprise a filtration step for partially removing free ions by an ultrafiltration method.

An antistatic coating material of the present invention comprises: the conductive composition and a solvent.

An antistatic coating of the present invention is produced by applying the antistatic coating material.

An antistatic film of the present invention comprises: a film base and the antistatic coating formed on at least one side of the film base.

An optical filter of the present invention comprises the antistatic coating.

An optical information recording medium of the present invention comprises the antistatic coating.

A capacitor of the present invention comprises: an anode composed of a porous valve metal body; a dielectric layer formed by oxidizing a surface of the anode; and a cathode formed on the dielectric layer, wherein the cathode has a solid electrolyte layer comprising the conductive composition.

In the capacitor, the cathode may further comprise an electrolyte.

A production method of a capacitor of the present invention, comprises the steps of: applying a conductive polymer solution, which comprises a π conjugated conductive polymer, a polyanion, a hydroxy group-containing aromatic compound, and a solvent, to a surface of a dielectric layer in a capacitor intermediate, which comprises an anode composed of a porous valve metal body and the dielectric layer formed by oxidizing a surface of the anode, and drying the conductive polymer solution.

The conductive composition of the present invention is excellent in conductivity and stability.

In the conductive composition of the present invention, if the hydroxy group-containing aromatic compound contains a sulfo group and/or a carboxy group, the conductivity increased.

If the conductive composition of the present invention further comprises a binder resin, a film formability and a film strength of a coating to be formed using the conductive composition are controlled.

According to the production method of the conductive composition of the present invention, the conductive composition having excellent conductivity and stability is easily obtained.

If the production method of the conductive composition comprises a filtration step for partially removing free ions by an ultrafiltration method, an operation for converting an anionic acid salt into an anionic acid is easily performed.

By applying the antistatic coating material of the present invention, an antistatic coating is formed having high conductivity, flexibility, and adhesion to a base. Moreover, such an antistatic coating material produces the antistatic coating at a low cost because a sufficient antistatic property is obtained by using it in a small amount.

In the antistatic coating material of the present invention, if the hydroxy group-containing aromatic compound contains a sulfo group and/or a carboxy group, the conductivity of the antistatic coating further increases.

If the antistatic coating material of the present invention further comprises a dopant, the conductivity of the antistatic coating further increases and heat resistance is improved.

If a binder resin is contained in the antistatic coating material, adhesion to a base is improved.

If the binder resin is at least one selected from the group consisting of: polyurethane, polyester, acryl resin, polyamide, polyimide, epoxy resin, polyimide silicone, and melamine resin, the binder resin is easily mixed with essential components of the antistatic material.

The antistatic coating is excellent in conductivity, flexibility, and adhesion to a base, and can be produced by a simple production method, that is, coating.

The antistatic film, optical filter, and optical information recording medium are excellent in antistatic properties, and prevent the occurrence of static electricity.

The capacitor of the present invention has a low equivalent series resistance because the conductivity of cathode is high.

In the capacitor of the present invention, if an electrolyte is contained in the cathode, the rate of deriving an electrostatic capacity increases.

The production method of the capacitor of the present invention enables to simply produce the capacitor having a high conductivity of cathode and a low equivalent series resistance.

DETAILED DESCRIPTION OF THE INVENTION

Figure 1:
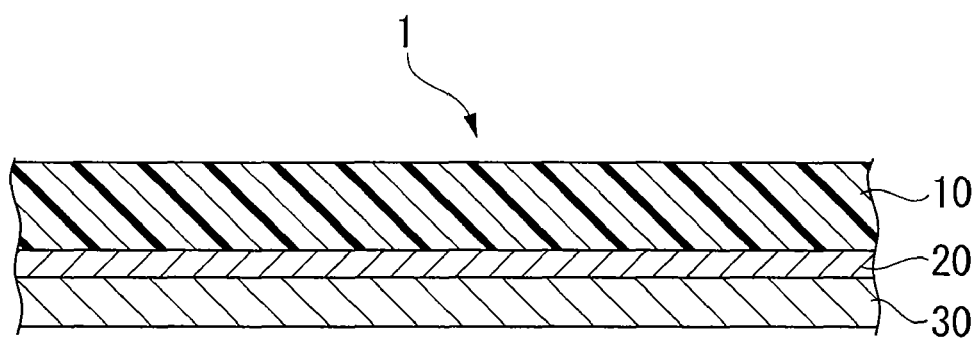
FIG. 1 is a cross-sectional view showing an embodiment of the optical filter according to the present invention.

A conductive composition according to the present invention is explained below.

The conductive composition of the present invention comprises a π conjugated conductive polymer, a polyanion, and a hydroxy group-containing aromatic compound containing two or more hydroxy groups.

Each component of the conductive composition is explained as follows.

(π Conjugated Conductive Polymer)

The π conjugated conductive polymers can be used if they are organic polymers in which the main chain is constructed by a π-conjugate system. Examples of the polymer include polypyrroles, polythiophenes, polyacetylenes, polyphenylenes, polyphenylene vinylenes, polyanilines, polyacenes, polythiophene vinylenes, and copolymers thereof. Polypyrroles, polythiophenes, and polyanilines are preferable from in view of ease of polymerization and stability in the air.

The π conjugated conductive polymers can be obtained sufficient conductivity and compatibility for binder resins as they are unsubstituted, but it is preferable that functional groups such as alkyl, carboxyl, sulfo, alkoxy, hydroxyl, and cyano groups are introduced into the π conjugated conductive polymers to increase the conductivity and dispersibility or solubility for binder resins.

Examples of the π conjugated conductive polymer specifically include polypyrrole, poly(3-methylpyrrole), poly(N-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), poly(3-methyl-4-hexyloxypyrrole), polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid), poly(3-anilinesulfonic acid), and the like.

Among these polymers, a (co)polymer composed of one or two compounds selected from polypyrrole, polythiophene, poly(N-methylpyrrol), poly(3-methylthiophene), poly(3,4-ethylenedioxythiophene) is suitably used in view of resistance value and reactivity. Polypyrrole and poly(3,4-ethylenedioxythiophene) are more preferable in view of increasing the conductivity and improving the heat resistance.

Moreover, alkyl-substituted compounds such as poly(N-methylpyrrol) and poly(3-methylthiophene) are more preferable because the solvent solubility, compatibility for binder resins, and dispersibility are improved. In the alkyl groups, methyl group is preferable because it does not exert an adverse effect on the conductivity. Furthermore, poly(3,4-ethylenedioxythiophene) doped with polystyrene sulfonate (abbreviated as PEDOT-PSS) is preferable in that the transparency after forming the coating film becomes favorable because it has higher heat stability and low degree of polymerization.

The above π conjugated conductive polymers can be easily produced by chemical oxidative polymerization of precursor monomers forming π conjugated conductive polymers in the presence of an appropriate oxidant, an oxidation catalyst, and a polyanion dopant described later.

(Precursor Monomers)

A precursor monomer has a π-conjugate system in a molecule and forms the π-conjugate system in the main chain when it is polymerized by the function of an appropriate oxidant. Examples of the precursor monomers include pyrroles and their derivatives, thiophenes and their derivatives, anilines and their derivatives, and the like.

Specific examples of the precursor monomers include pyrrole, 3-methylpyrrole, 3-ethylpyrrole, 3-n-propylpyrrole, 3-butylpyrrole, 3-octylpyrrole, 3-decylpyrrole, 3-dodecylpyrrole, 3,4-dimethylpyrrole, 3,4-dibutylpyrrole, 3-carboxypyrrole, 3-methyl-4-carboxypyrrole, 3-methyl-4-carboxyethylpyrrole, 3-methyl-4-carboxybutylpyrrole, 3-hydroxypyrrole, 3-methoxypyrrole, 3-ethoxypyrrole, 3-butoxypyrrole, 3-hexyloxypyrrole, 3-methyl-4-hexyloxypyrrole, N-methylpyrrole, thiophene, 3-methyl-thiophene, 3-ethylthiophene, 3-propylthiophene, 3-butylthiophene, 3-hexylthiophene, 3-heptylthiophene, 3-octylthiophene, 3-decylthiophene, 3-dodecylthiophene, 3-octadecylthiophene, 3-bromothiophene, 3-chlorothiophene, 3-iodothiophene, 3-cyanothiophene, 3-phenylthiophene, 3,4-dimethylthiophene, 3,4-dibutylthiophene, 3-hydroxythiophene, 3-methoxythiophene, 3-ethoxythiophene, 3-butoxythiophene, 3-hexyloxythiophene, 3-heptyloxythiophene, 3-octyloxythiophene, 3-decyloxythiophene, 3-dodecyloxythiophene, 3-octadecyloxythiophene, 3,4-dihydroxythiophene, 3,4-dimethoxythiophene, 3,4-diethoxythiophene, 3,4-dipropoxythiophene, 3,4-dibutoxythiophene, 3,4-dihexyloxythiophene, 3,4-diheptyloxythiophene, 3,4-dioctyloxythiophene, 3,4-didecyloxythiophene, 3,4-didodecyloxythiophene, 3,4-ethylenedioxythiophene, 3,4-propylenedioxythiophene, 3,4-butenedioxythiophene, 3-methyl-4-methoxythiophene, 3-methyl-4-ethoxythiophene, 3-carboxythiophene, 3-methyl-4-carboxythiphene, 3-methyl-4-carboxyethylthiphene, 3-methyl-4-carboxybutylthiphene, aniline, 2-methylaniline, 3-isobutylaniline, 2-anilinesulfonic acid, 3-anilinesulfonic acid, and the like.

(Solvents)

As solvents used in the preparation of the π conjugated conductive polymers, they are not specially limited and may be solvents which are able to dissolve or disperse the precursor monomers and keep the oxidizing power of oxidants and oxidation catalysts. For example, polar solvents such as water, N-methyl-2-pyrrolidone, N,N-dimethylformamide, N,N-dimethylacetamide, dimethylsulfoxide, hexamethylene phosphortriamide, acetonitrile, benzonitrile, hexamethylphosphoric triamide, 1,3-dimethyl-2-imidazolidine, dimethylimidazoline, ethyl acetate, sulforan, diphenyl sulfone, and the like; phenols such as cresol, phenol, xylenol, and the like; alcohols such as methanol, ethanol, propanol, butanol, and the like; ketones such as acetone, methyl ethyl ketone, hydrocarbons such as hexane, benzene, toluene, and the like; carboxylic acids such as formic acid, acetic acid, and the like; carbonate compounds such as ethylene carbonate, propylene carbonate, and the like; ether compounds such as dioxane, diethyl ether, and the like; chain ethers such as ethylene glycol dialkyl ethers, propylene glycol dialkyl ethers, and the like; heterocyclic compounds such as 3-methyl-2-oxazolidinone, nitrile compounds such as acetonitrile, glutarodinitrile, methoxyacetonitrile, propionitrile, benzonitrile, and the like are given. These solvents may be used individually, as mixtures of two or more of them, or as mixtures with other organic solvents.

(Oxidants and Oxidation Catalysts)

Oxidants and oxidation catalysts may be ones which are able to oxidize the precursor monomers to obtain the π conjugated conductive polymers. Examples of them include peroxodisulfates such as ammonium peroxodisulfate, sodium peroxodisulfate, potassium peroxodisulfate, and the like; transition metal compounds such as ferric chloride, ferric sulfate, ferric nitrate, cupric chloride, and the like; metal halide compounds such as boron trifluoride, aluminum chloride, and the like; metal oxides such as silver oxide, cesium oxide, and the like; peroxides such as hydrogen peroxide, ozone, and the like; organic peroxides such as benzoyl peroxide, and the like; oxygen, and the like.

(Polyanion)

Polyanions are substituted or unsubstituted polyalkylenes, substituted or unsubstituted polyalkylenes, substituted or unsubstituted polyimides, substituted or unsubstituted polyamides, substituted or unsubstituted polyesters, and copolymers thereof, and are composed of structure units having anion groups and structure units having no anion groups.

Anion groups of polyanion function as a dopant for the π conjugated conductive polymer and improve conductivity and heat resistance of the π conjugated conductive polymer.

Polyalkylenes are polymers in which the main chain is constructed by repeated methylenes. Examples of polyalkylenes include polyethylene, polypropylene, polybutene, polypentene, polyhexene, polyvinyl alcohol, polyvinyl phenol, poly-3,3,3-trifluoropropylene, polyacrylonitrile, polyacrylate, polystyrene, and the like.

Polyalkenylenes are polymers composed of structural units in which one or more unsaturated bonds (vinyl groups) are contained in the main chain. Specific examples of polyalkenylenes include polymers comprising one or more structural units selected from propenylene, 1-methylpropenylene, 1-butylpropenylene, 1-decylpropenylene, 1-cyanopropenylene, 1-phenylpropenylene, 1-hydroxypropenylene, 1-butenylene, 1-methyl-1-butenylene, 1-ethyl-1-butenylene, 1-octyl-1-butenylene, 1-pentadecyl-1-butenylene, 2-methyl-1-butenylene, 2-ethyl-1-butenylene, 2-butyl-1-butenylene, 2-hexyl-1-butenylene, 2-octyl-1-butenylene, 2-decyl-1-butenylene, 2-dodecyl-1-butenylene, 2-phenyl-1-butenylene, 2-butenylene, 1-methyl-2-butenylene, 1-ethyl-2-butenylene, 1-octyl-2-butenylene, 1-pentadecyl-2-butenylene, 2-methyl-2-butenylene, 2-ethyl-2-butenylene, 2-butyl-2-butenylene, 2-hexyl-2-butenylene, 2-octyl-2-butenylene, 2-decyl-2-butenylene, 2-dodecyl-2-butenylene, 2-phenyl-2-butenylene, 2-propylenephenyl-2-butenylene, 3-methyl-2-butenylene, 3-ethyl-2-butenylene, 3-butyl-2-butenylene, 3-hexyl-2-butenylene, 3-octyl-2-butenylene, 3-decyl-2-butenylene, 3-dodecyl-2-butenylene, 3-phenyl-2-butenylene, 3-propylene-phenyl-2-butenylene, 2-pentenylene, 4-propyl-2-pentenylene, 4-butyl-2-pentenylene, 4-hexyl-2-pentenylene, 4-cyano-2-pentenylene, 3-methyl-2-pentenylene, 4-ethyl-2-pentenylene, 3-phenyl-2-pentenylene, 4-hydroxy-2-pentenylene, hexenylene, and the like.

In these polymers, substituted or unsubstituted butenylens are preferable from the fact that an interaction between an unsaturated bond and a π conjugated conductive polymer exists and substituted or unsubstituted butadienes are easily synthesized as starting materials.

Examples of polyimides include polyimides from anhydrides such as pyromellitic dianhydride, biphenyltetracarboxylic dianhydride, benzophenone tetracarboxylic dianhydride, 2,2,3,3-tetracarboxyphenyl ether dianhydride, and 2,2-[4,4'-di(dicarboxyphenyloxy)phenyl]propane dianhydride; and diamines such as oxydiamine, p-phenylenediamine, m-phenylenediamine, and benzophenonediamine.

Examples of polyamides include polyamide 6, polyamide 6, 6, polyamide 6, 10, and the like.

Examples of polyesters include polyethylene terephthalate, polybutylene terephthalate, and the like.

When polyanions have substituents, examples of substituents include alkyl, hydroxyl, amino, carboxyl, cyano, phenyl, phenol, ester, alkoxy groups, and the like. If solubility for solvents, heat resistance, and compatibility with resins are considered, alkyl, hydroxyl, phenol, and ester groups are preferable.

Alkyl groups can increase solubility for and dispersibility in polar solvents or nonpolar solvents, and compatibility with and dispersibility in resins. Hydroxyl groups can easily form a hydrogen bond with another hydrogen atom and increase solubility for organic solvents and compatibility with, dispersibility for, and adhesion to resins. Moreover, cyano and hydroxyphenyl groups can increase compatibility with and solubility for polar resins and also increase heat resistance.

In the above substituents, alkyl, hydroxyl, ester, and cyano groups are preferable.

Examples of the alkyl groups include chain alkyl groups such as methyl, ethyl, propyl, butyl, isobutyl, t-butyl, pentyl, hexyl, octyl, decyl, and dodecyl groups; and cycloalkyl groups such as cyclopropyl, cyclopentyl, and cyclohexyl groups. If solubility for solvents, dispersibility in resins, steric hindrance, and the like are considered, $C_1$ to $C_{12}$ alkyl groups are more preferable.

Examples of the hydroxyl groups include hydroxyl groups directly bonded to the main chain of polyanions or hydroxyl groups bonded to the main chain via other functional groups. Examples of the other functional groups include $C_1$ to $C_7$ alkyl groups, $C_2$ to $C_7$ alkenyl groups, amide groups, imide groups, and the like. The hydroxyl groups are substituted at the end or in these functional groups. In these groups, hydroxyl groups bonded at the end of $C_1$ to $C_6$ alkyl groups are more preferable in view of compatibility with resins and solubility for organic solvents.

Examples of the amino groups include amino groups directly bonded to the main chain of polyanions or amino group bonded to the main chain via other functional groups. Examples of the other functional groups include $C_1$ to $C_7$ alkyl groups, $C_2$ to $C_7$ alkenyl groups, amide groups, imide groups, and the like. The amino groups are substituted at the end or in these functional groups.

Examples of the phenol groups, phenol groups directly bonded to the main chain of polyanions or phenol group bonded to the main chain via other functional groups. Examples of the other functional groups include $C_1$ to $C_7$ alkyl groups, $C_2$ to $C_7$ alkenyl groups, amide groups, imide groups, and the like. The phenol groups are substituted at the end or in these functional groups.

Examples of the ester groups include alkyl ester groups or aromatic ester groups directly bonded to the main chain of polyanions or alkyl ester groups or aromatic ester groups bonded to the main chain via other functional groups.

Examples of the cyano groups include cyano groups directly bonded to the main chain of polyanions or cyano groups bonded to the end of $C_1$ to $C_7$ alkyl groups bonded to the main chain, cyano groups bonded the end of $C_2$ to $C_7$ alkenyl groups to the main chain, and the like.

Any anion group among polyanions can be used if the anion group can be doped with the π conjugated conductive polymer by chemical oxidation, and preferred examples include a mono-substituted sulfuric acid ester group, mono-substituted phosphoric acid ester group, phosphoric group, carboxy group, and sulfo groups in view of easy production and stability. Furthermore, a sulfo group, mono-substituted phosphoric acid ester group, carboxy group, and the like are more preferable in view of the doping effect of the functional groups to the π conjugated conductive polymers.

Preferred anion groups are provided in the main chain of polyanions adjacently or at a constant interval.

Specific examples of polyanions include polyvinyl sulfonic acid, polystyrene sulfonic acid, polyallyl sulfonic acid, polyethyl acrylate sulfonic acid, polybutyl acrylate sulfonic acid, polyacryl sulfonic acid, polymethacryl sulfonic acid, poly-2-acrylamide-2-methylpropane sulfonic acid, polyisoprene sulfonic acid, polyvinyl carboxylic acid, polystyrene carboxylic acid, polyallyl carboxylic acid, polyacryl carboxylic acid, polymethacryl carboxylic acid, poly-2-acrylamide-2-methylpropane carboxylic acid, polyisoprene carboxylic acid, polyacrylic acid, and the like.

These polyanions may be homopolymers or copolymers of two or more of them.

Among these polyanions, polystyrene sulfonic acid, polyisoprene sulfonic acid, polyethyl acrylate sulfonic acid, polybutyl acrylate sulfonic acid are preferable from effects of increasing compatibility with binder resins, further increasing conductivity of resultant antistatic coating material, and suppressing thermal decomposition of the π conjugated conductive polymers.

Examples of production methods of polyanions include a method wherein an anion group is directly introduced into a polymer free of an anion group with an acid, a method wherein a polymer free of an anion group is sulfonated with a sulfonating agent, and a method wherein a polymer is produced by polymerization of an anion group containing polymerizable monomer.

As the method wherein a polymer is produced by polymerization of an anion group containing polymerizable monomer, a method wherein an anion group containing polymerizable monomer is produced by oxidative polymerization or radical polymerization in a solvent in the presence of an oxidant and/or a polymerization catalyst. Specifically, a predetermined amount of an anion group containing polymerizable monomer is dissolved in a solvent, kept to a certain temperature, a solution obtained by dissolving predetermined amounts of an oxidant and/or a polymerization catalyst in a solvent beforehand is added thereto and then the mixture is reacted for a predetermined time. A polymer obtained by this reaction is adjusted to a certain concentration with a solvent. In this preparation method, a polymerizable monomer free of an anion group may also be copolymerized with an anion group containing polymerizable monomer.

The oxidants, oxidation catalysts, and solvents to be used in the polymerization of an anion group containing polymerizable monomers are same as those used in the polymerization of precursor monomers forming the π conjugated conductive polymers.

When the obtained polymers are polyanion salts, they are preferably modified into polyanionic acids. As methods for modifying the polymers into polyanionic acids, ion-exchange method using an ion-exchange resin, dialysis method, ultrafiltration method, and the like are given, and the ultrafiltration method is preferable in view of easy operation.

A part of the anion group containing polymerizable monomers is substituted by a mono-substituted sulfate group, a carboxyl group, sulfo group, and the like. Examples of anion group containing polymerizable monomers include a substituted or unsubstituted ethylenesulfonic acid compound, a substituted or unsubstituted styrene sulfonic acid compound, a substituted or unsubstituted acrylate sulfonic acid compound, a substituted or unsubstituted methacrylate sulfonic acid compound, a substituted or unsubstituted acrylamide sulfonic acid compound, a substituted or unsubstituted cyclovinylene sulfonic acid compound, a substituted or unsubstituted butadiene sulfonic acid compound, and a substituted or unsubstituted vinyl aromatic sulfonic acid compound.

Specific examples include vinyl sulfonic acid and salts thereof, allyl sulfonic acid and salts thereof, methallylsulfonic acid and salts thereof, styrene sulfonic acid, methallyloxy benzene sulfonic acid and salts thereof, allyloxy benzene sulfonic acid and salts thereof, α-methylstyrenesulfonic acid and salts thereof, acrylamide-t-butyl sulfonic acid and salts thereof, 2-acrylamide-2-methylpropane sulfonic acid and salts thereof, 2-acrylamide-2-methylpropane sulfonic acid and salts thereof, cyclobutene-3-sulfonic acid and salts thereof, isoprene sulfonic acid and salts thereof, 1,3-butadiene-1-sulfonic acid and salts thereof, 1-methyl-1,3-butadiene-2-sulfonic acid and salts thereof, 1-methyl-1,3-butadiene-4-sulfonic acid and salts thereof, ethyl acrylate sulfonic acid ($CH_2CH-COO-(CH_2)_2-SO_3H$) and salts thereof, propyl acrylate sulfonic acid ($CH_2CH-COO-(CH_2)_3-SO_3H$) and salts thereof, t-butyl acrylate sulfonic acid ($CH_2CH-COO-C(CH_3)_2-SO_3H$) and salts thereof, n-butyl acrylate sulfonic acid ($CH_2CH-COO-(CH_2)_4-SO_3H$) and salts thereof, ethyl vinylacetate sulfonic acid ($CH_2CHCH_2-COO-(CH_2)_2-SO_3H$) and salts thereof, t-butyl vinylacetate sulfonic acid ($CH_2CH(CH_2)_2-COO-C(CH_3)_2CH_2-SO_3H$) and salts thereof, ethyl 4-pentenoate sulfonic acid ($CH_2CH(CH_2)_2-COO-(CH_2)_2-SO_3H$) and salts thereof, propyl 4-pentenoate sulfonic acid ($CH_2CH(CH_2)_2-COO-(CH_2)_3-SO_3H$) and salts thereof, n-butyl 4-pentenoate sulfonic acid ($CH_2CH-(CH_2)_2-COO-(CH_2)_4-SO_3H$) and salts thereof, t-butyl 4-pentenoate sulfonic acid ($CH_2CH(CH_2)_2-COO-C(CH_3)_2-CH_2-SO_3H$) and salts thereof, phenylene 4-pentenoate sulfonic acid ($CH_2CH(CH_2)_2-COO-C_6H_4-SO_3H$) and salts thereof, naphthalene 4-pentenoate sulfonic acid ($CH_2CH(CH_2)_2-COO-C_{10}H_8-SO_3H$) and salts thereof, ethyl methacrylate sulfonic acid ($CH_2C(CH_3)-COO-(CH_2)_2-$ SO₃H) and salts thereof, propyl methacrylate sulfonic acid (CH₂C(CH₃)—COO—(CH₂)₃—SO₃H) and salts thereof, t-butyl methacrylate sulfonic acid (CH₂C(CH₃)—COO—C(CH₃)₂CH₂—SO₃H) and salts thereof, n-butyl methacrylate sulfonic acid (CH₂C(CH₃)—COO—(CH)₄—SO₃H) and salts thereof, phenylene methacrylate sulfonic acid (CH₂C(CH₃)—COO—C₆H₄—SO₃H) and salts thereof, naphthalene methacrylate sulfonic acid (CH₂C(CH₃)—COO—C₁₀H₈—SO₃H) and salts thereof, polyvinyl carboxylic acid, polystyrene carboxylic acid, polyallyl carboxylic acid, polyacryl carboxylic acid, polymethacryl carboxylic acid, poly-2-acrylamide-2-methylpropanecarboxylic acid, polyisoprene carboxylic acid, polyacrylic acid, and the like. The polyanions may also be copolymers containing two or more of them.

Examples of polymerizable monomers free of an anion group include ethylene, propene, 1-butene, 2-butene, 1-pentene, 2-pentene, 1-hexene, 2-hexene, styrene, p-methylstyrene, p-ethylstyrene, p-butylstyrene, 2,4,6-trimethylstyrene, p-methoxystyrene, α-methylstyrene, 2-vinylnaphthalene, 6-methyl-2-vinylnaphthalene, 1-vinylimidazole, vinylpyridine, vinyl acetate, acrylaldehyde, acrylonitrile, N-vinyl-2-pyrrolidone, N-vinylacetamide, N-vinylformamide, N-vinylimidazole, acrylamide, N,N-dimethylacrylamide, acrylic acid, methyl acrylate, ethyl acrylate, propyl acrylate, n-butyl acrylate, i-butyl acrylate, t-butyl acrylate, i-octyl acrylate, i-nonylbutyl acrylate, lauryl acrylate, allyl acrylate, stearyl acrylate, i-bonyl acrylate, cyclohexyl acrylate, benzyl acrylate, ethylcarbitol acrylate, phenoxyethyl acrylate, hydroxyethyl acrylate, methoxyethyl acrylate, ethoxyethyl acrylate, methoxybutyl acrylate, methacrylic acid, methyl methacrylate, ethyl methacrylate, n-butyl methacrylate, i-butyl methacrylate, t-butyl methacrylate, 2-ethylhexyl methacrylate, lauryl methacrylate, tridecyl methacrylate, stearyl methacrylate, cyclohexyl methacrylate, benzyl methacrylate, 2-hydroxyethyl methacrylate, 2-hydroxypropyl methacrylate, acryloylmorpholine, vinylamine, N,N-dimethylvinylamine, N,N-diethylvinylamine, N,N-dibutylvinylamine, N,N-di-t-butylvinylamine, N,N-diphenylvinylamine, N-vinylcarbazole, vinyl alcohol, vinyl chloride, vinyl fluoride, methyl vinyl ether, ethyl vinyl ether, cyclopropene, cyclobutene, cyclopentene, cyclohexene, cycloheptene, cyclooctene, 2-methylcyclohexene, vinylphenol, 1,3-butadiene, 1-methyl-1,3-butadiene, 2-methyl-1,3-butadiene, 1,4-dimethyl-1,3-butadiene, 1,2-dimethyl-1,3-butadiene, 1,3-dimethyl-1,3-butadiene, 1-octyl-1,3-butadiene, 2-octyl-1,3-butadiene, 1-phenyl-1,3-butadiene, 2-phenyl-1,3-butadiene, 1-hydroxy-1,3-butadiene, 2-hydroxy-1,3-butadiene, and the like.

As a polyanion, a polyisoprene sulfonic acid, a copolymer containing a polyisoprene sulfonic acid, a polymethallyl sulfonic acid, a copolymer containing a polymethallyl sulfonic acid, a polysulfoethyl methacrylate, a copolymer containing a polysulfoethyl methacrylate, a poly(4-sulfobutyl methacrylate), a copolymer containing a poly(4-sulfobutyl methacrylate), a polymethallyloxybenzene sulfonic acid, a copolymer containing a polymethallyloxybenzene sulfonic acid, a polystyrene sulfonic acid, a copolymer containing a polystyrene sulfonic acid, and the like are preferred in view of solubility in a solvent and conductivity.

The solvent solubility and compatibility with binder resins can be controlled by copolymerizing these polymerizable monomers free of an anion group.

The degree of polymerization of polyanions is preferably in a range of 10 to 10000 monomer units, more preferably in a range of 50 to 10000 monomer units in view of solubility in a solvent and conductivity.

The content of polyanions contained in the conductive composition, the antistatic coating material, or the solid electrolyte layer of the capacitor is preferably 0.1 to 10 mol, and more preferably 1 to 7 mol to 1 mol of the π conjugated conductive polymer. If the content of polyanions is less than 0.1 mol, the doping effect on the π conjugated conductive polymer tends to weaken, and conductivity may be insufficient. In addition, the dispersibility and solubility in the solvent are deteriorated making it difficult to obtain uniform dispersions. If the content of polyanions is more than 10 mol, the content of the π conjugated conductive polymer in the conductive composition decreases making it difficult to obtain sufficient conductivity.

(Hydroxy Group-Containing Aromatic Compound)

A hydroxy group-containing aromatic compound is composed of an aromatic ring to which two or more hydroxy groups are bonded. The hydroxy group-containing aromatic compound has a strong interaction between the hydroxy groups and the aromatic ring, and tends to release hydrogen from the compound.

Examples of hydroxy group-containing aromatic compounds include 1,4-dihydroxybenzene, 1,3-dihydroxybenzene, 2,3-dihydroxy-1-pentadecylbenzene, 2,4-dihydroxyacetophenone, 2,5-dihydroxyacetophenone, 2,4-dihydroxybenzophenone, 2,6-dihydroxybenzophenone, 3,4-dihydroxybenzophenone, 3,5-dihydroxybenzophenone, 2,4'-dihydroxydiphenylsulfone, 2,2',5,5'-tetrahydroxydiphenylsulfone, 3,3',5,5'-tetramethyl-4,4'-dihydroxydiphenylsulfone, hydroxyquinone carboxylic acid and salts thereof, 2,3-dihydroxy benzoic acid, 2,4-dihydroxy benzoic acid, 2,5-dihydroxy benzoic acid, 2,6-dihydroxy benzoic acid, 3,5-dihydroxy benzoic acid, 1,4-hydroquinone sulfonic acid and salts thereof, 4,5-hydroxybenzene-1,3-disulfonic acid and salts thereof, 1,5-dihydroxynaphthalene, 1,6-dihydroxynaphthalene, 2,6-dihydroxynaphthalene, 2,7-dihydroxynaphthalene, 2,3-dihydroxynaphthalene, 1,5-dihydroxynaphthalene-2,6-dicarboxylic acid, 1,6-dihydroxynaphthalene-2,5-dicarboxylic acid, 1,5-dihydroxynaphthoic acid, 1,4-dihydroxy-2-phenyl naphthoate, 4,5-dihydroxynaphthalene-2,7-disulfonic acid and salts thereof, 1,8-dihydroxy-3,6-naphthalenedisulfonic acid and salts thereof, 6,7-dihydroxy-2-naphthalenesulfonic acid and salts thereof, 1,2,3-trihydroxybenzene (pyrogallol), 1,2,4-trihydroxybenzene, 5-methyl-1,2,3-trihydroxybenzene, 5-ethyl-1,2,3-trihydroxybenzene, 5-propyl-1,2,3-trihydroxybenzene, trihydroxy benzoic acid, trihydroxyacetophenone, trihydroxybenzophenone, trihydroxybenzaldehyde, trihydroxyanthraquinone, 2,4,6-trihydroxybenzene, tetrahydroxy-p-benzoquinone, tetrahydroxyanthraquinone, and the like.

Among these hydroxy group-containing aromatic compounds, a compound containing a sulfo group and/or a carboxy group as anion groups which are able to dope the π conjugated conductive polymer is preferred in view of conductivity.

Among these hydroxy group-containing aromatic compounds, a compound represented by the above formula (1) is preferred in view of superior conductivity and stability.

Specific examples of R in formula (1) include alkyl groups such as methyl, ethyl, n-propyl, i-propyl, n-butyl, t-butyl, n-hexyl, i-hexyl, t-hexyl, and sec-hexyl groups; alkenyl groups such as vinyl, propenyl, and butenyl groups; cycloalkyl groups such as a cyclohexyl and cyclopentyl groups; cycloalkenyl groups such as cyclohexenyl group; aryl groups such as phenyl and naphthyl groups; aralkyl groups such as benzyl and phenethyl groups; and the like.

The content of the hydroxy group-containing aromatic compound is preferably 0.05 to 10 mol, more preferably 0.3 to 5 mol to 1 mol of the polyanion. If the content of the hydroxy group-containing aromatic compound is less than 0.05 mol, conductivity and heat resistance may be insufficient. If the content of the hydroxy group-containing aromatic compound is more than 10 mol, the content of the π conjugated conductive polymer in the conductive composition decreases making it difficult to obtain sufficient conductivity, and then the properties of the conductive composition, the antistatic coating material, or the solid electrolyte layer of the capacitor may be changed.

(Dopant)

Dopants Other than Polyanion Dopants May Also be Added to Improve the electric conductivity and heat stability. If the oxidation-reduction potential of the π conjugated conductive polymers can be changed, the other dopants may be donors or acceptors.

(Donor Dopant)

Examples of donor dopants include alkali metals such as sodium, potassium, and the like; alkali-earth metals such as calcium, magnesium, and the like; quaternary amine compounds such as tetramethylammonium, tetraethylammonium, tetrapropylammonium, tetrabutylammonium, methyltriethylammonium, dimethyldiethylammonium, and the like.

(Acceptor Dopant)

Examples of acceptor dopants include halogen compounds, Lewis acids, protonic acids, organic cyano compounds, organic metal compounds, and the like.

Examples of halogen compounds include chlorine ($Cl_2$), bromine ($Br_2$), iodine ($I_2$), iodine chloride (ICl), iodine bromide (IBr), iodine fluoride (IF), and the like.

Examples of Lewis acids include $PF_5$, $AsF_5$, $SbF_5$, $BF_5$, $BCl_5$, $BBr_5$, $SO_3$, and the like.

Examples of organic cyano compounds include compounds containing two or more cyano groups in the conjugated bond such as tetracyanoethylene, tetracyanoethyleneoxide, tetracyanobenzene, dichlorodicyanobenzoquinone (DDQ), tetracyanoquinodimethane, tetracyanoazanaphthalene, and the like.

The protonic acids include inorganic acids and organic acids. Examples of inorganic acids include hydrochloric acid, sulfuric acid, nitric acid, phosphoric acid, borohydrofluoric acid, hydrofluoric acid, perchloric acid, and the like. Examples of organic acids include organic carboxylic acids, phenols, organic sulfonic acids, and the like.

The organic carboxylic acid may be those having one or more carboxy groups in the aliphatic, aromatic, or cyclic aliphatic series. Examples of the organic carboxylic acids include formic acid, acetic acid, oxalic acid, benzoic acid, phthalic acid, maleic acid, fumaric acid, malonic acid, tartaric acid, citric acid, lactic acid, succinic acid, monochloroacetic acid, dichloroacetic acid, trichloroacetic acid, trifluoroacetic acid, nitroacetic acid, triphenylacetic acid, and the like.

As organic sulfonic acids, those containing one, two or more sulfo groups in aliphatic, aromatic, and cyclic aliphatic compound or polymers containing sulfo groups can be used.

Examples of organic sulfonic acids containing one sulfo group include methanesulfonic acid, ethanesulfonic acid, 1-propanesulfonic acid, 1-butanesulfonic acid, 1-hexanesulfonic acid, 1-heptanesulfonic acid, 1-octanesulfonic acid, 1-nonanesulfonic acid, 1-decanesulfonic acid, 1-dodecanesulfonic acid, 1-tetradecanesulfonic acid, 1-pentadecanesulfonic acid, 2-bromoethanesulfonic acid, 3-chloro-2-hydroxypropanesulfonic acid, trifluoromethanesulfonic acid, colistinmethanesulfonic acid, 2-acrylamide-2-methylpropanesulfonic acid, aminomethanesulfonic acid, 1-amino-2-naphthol-4-sulfonic acid, 2-amino-5-naphthol-7-sulfonic acid, 3-aminopropanesulfonic acid, N-cyclohexyl-3-aminopropanesulfonic acid, benzenesulfonic acid, p-toluenesulfonic acid, xylenesulfonic acid, ethylbenzenesulfonic acid, propylbenzenesulfonic acid, butylbenzenesulfonic acid, pentylbenzenesulfonic acid, hexylbenzenesulfonic acid, heptylbenzenesulfonic acid, octylbenzenesulfonic acid, nonylbenzenesulfonic acid, decylbenzenesulfonic acid, undecylbenzenesulfonic acid, dodecylbenzenesulfonic acid, pentadecylbenzenesulfonic acid, hexadecylbenzenesulfonic acid, 2,4-dimethylbenzenesulfonic acid, dipropylbenzenesulfonic acid, butylbenzensulfonic acid, 4-aminobenzenesulfonic acid, o-aminobenzenesulfonic acid, m-aminobenzenesulfonic acid, 4-amino-2-chrolotoluene-5-sulfonic acid, 4-amino-3-methylbenzene-1-sulfonic acid, 4-amino-5-methoxy-2-methylbenzenesulfonic acid, 2-amino-5-methylbenzene-1-sulfonic acid, 5-amino-2-methylbenzene-1-sulfonic acid, 4-amino-3-methylbenzene-1-sulfonic acid, 4-acetamide-3-chlorobenzenesulfonic acid, 4-chrolo-3-nitrobenzensulfonic acid, p-chlorobenzenesulfonic acid, naphthalenesulfonic acid, methylnaphthalenesulfonic acid, propylnaphthalenesulfonic acid, butylnaphthalenesulfonic acid, pentylnaphthalenesulfonic acid, dimethylnaphthalenesulfonic acid, 4-amino-1-naphthalenesulfonic acid, 8-chloronaphthalene-1-sulfonic acid, naphthalenesulfonic acid formalin condensation polymer, melaminesulfonic acid formalin condensation polymer, anthraquinonesulfonic acid, pyrenesulfonic acid, and the like. Furthermore, metal salts thereof can also be used.

Examples of organic sulfonic acids containing two or more sulfo groups include ethanedisulfonic acid, butanedisulfonic acid, pentanedisulfonic acid, decanedisulfonic acid, o-benzenedisulfonic acid, m-benzenedisulfonic acid, p-benzenedisulfonic acid, toluenedisulfonic acid, xylenedisulfonic acid, chlorobenzenedisulfonic acid, fluorobenzenedisulfonic acid, dimethylbenzenedisulfonic acid, diethylbenzenedisulfonic acid, aniline-2,4-disulfonic acid, aniline-2,5-disulfonic acid, 3,4-dihydroxy-1,3-benzene disulfonic acid, naphthalenedisulfonic acid, methylnaphthalenedisulfonic acid, ethylnaphthalenedisulfonic acid, pentadecylnaphthalenedisulfonic acid, 3-amino-5-hydroxy-2,7-naphthalenedisulfonic acid, 1-acetoamide-8-hydroxy-3,6-naphthalenedisulfonic acid, 2-amino-1,4-benzenedisulfonic acid, 1-amino-3,8-naphthalenedisulfonic acid, 3-amino-1,5-naphthalenedisulfonic acid, 8-amino-1-naphthol-3,6-disulfonic acid, 4-amino-5-naphthol-2,7-disulfonic acid, 4-acetamide-4'-isothiocyanatostilbene-2,2'-disulfonic acid, 4-acetoamide-4'-maleimidylstilbene-2,2'-disulfonic acid, naphthalene trisulfonic acid, dinaphthylmethanedisulfonic acid, anthraquinonedisulfonic acid, anthracenesulfonic acid, and the like. Furthermore, metal salts thereof can also be used.

The conductive composition of the present invention may be composed of the above-described three components, and a binder resin may be contained in the conductive composition in order to control coating formability, strength, and the like of a coating formed from the conductive composition. Furthermore, it is preferable that the antistatic coating material contains a binder resin because the scratch resistance and surface hardness of a coating are increased and the adhesion with a base is improved. When the antistatic coating material contains a binder resin, the pencil hardness (JIS K 5400) of the antistatic coating formed from the antistatic coating material is easily made to HB or harder. Namely, the binder resin functions as a hard coat component.

As binder resins, they may be thermosetting resins or thermoplastic resins if they are compatible with or mixable/dispersible in each component in the conductive composition or in the antistatic coating material. Examples of binder resins include polyesters such as polyethylene terephthalate, polybutylene terephthalate, polyethylene naphthalate, and the like; polyimides such as polyimide, polyamideimide, and the like; polyamides such as polyamide 6, polyamide 6, 6, polyamide 12, polyamide 11, and the like; fluororesins such as polyvinylidene fluoride, polyvinyl fluoride, polytetrafluoroethylene, ethylenetetrafluoroethylene copolymer, polychlorotrifluoroethylene, and the like; vinyl resins such as polyvinyl alcohol, polyvinyl ether, polyvinyl butyral, polyvinyl acetate, polyvinyl chloride, and the like; epoxy resin; oxetane resin; xylene resin; aramide resin; polyimide silicone; polyurethane; polyurea; melamine resin; phenol resin; polyether; acrylic resin, and their copolymers.

These binder resins may be dissolved in organic solvents, made into solutions by imparting functional groups such as a sulfo or carboxyl group to the resins, or dispersed in water by emulsification and the like.

If necessary, curing agents such as a crosslinking agent, polymerization initiator, and the like, a polymerization accelerator, solvent, viscosity modifier, or the like can be added.

Among these binder resins, any one or more of polyurethane, polyester, acrylic resin, polyamide, polyimide, epoxy resin, polyimide silicone, and melamine resin are preferably used because these are easy to mix. Moreover, acrylic resins are suited to such purposes as an optical filter because they have high hardness and excellent transparency.

Furthermore, the acrylic resin preferably contains a heat-curable or photo-curable liquid polymer.

The heat-curable liquid polymer can be, for example, a reactive polymer or a self-crosslinkable polymer.

The reactive polymers are polymers obtained by polymerizing a monomer with a substituent such as hydroxyl, carboxyl, anhydride, oxetane, glycidyl, and amino groups. Examples of the monomers include polyfunctional alcohols such as ethylene glycol, diethylene glycol, dipropylene glycol, glycerin, and the like; carboxylic acid compounds such as malonic acid, succinic acid, glutamic acid, pimelic acid, ascorbic acid, phthalic acid, acetylsalicylic acid, adipic acid, isophthalic acid, benzoic acid, m-toluic acid, and the like; acid anhydrides such as maleic acid anhydride, phthalic acid anhydride, dodecylsuccinic anhydride, dichloromaleic anhydride, tetrachlorophthalic anhydride, tetrahydrophthalic anhydride, pyromellitic acid anhydride, and the like; oxetane compounds such as 3,3-dimethyloxetane, 3,3-dichloromethyloxetane, 3-methyl-3-hydroxymethyloxetane, azidomethylmethyloxetane, and the like; glycidyl ether compounds such as bisphenol A diglycidyl ether, bisphenol F diglycidyl ether, phenol novolac polyglycidyl ether, N,N-diglycidyl-p-aminophenol glycidyl ether, tetrabromobisphenol A diglycidyl ether, hydrogenated bisphenol A diglycidyl ether (i.e., 2,2-bis(4-glycidyloxycyclohexyl)propane), and the like; glycidyl amine compounds such as N,N-diglycidylaniline, tetraglycidyldiaminodiphenylmethane, N,N,N,N-tetraglycidyl-m-xylylenediamine, triglycidyl isocyanurate, N,N-diglycidyl-5,5-dialkylhydantoin, and the like; amine compounds such as diethylenetriamine, triethylenetetramine, dimethylaminopropylamine, N-aminoethylpiperazine, benzyldimethylamine, tris(dimethylaminomethyl)phenol, DHP30-tri(2-ethyl hexoate), metaphenylenediamine, diaminodiphenylmethane, diaminodiphenyl sulfone, dicyanodiamide, boron trifluoride, monoethylamine, methanediamine, xylenediamine, ethylmethylimidazole, and the like; glycidyl compounds based on epichlorohydrin of bisphenol A in compounds containing two or more oxirane rings in a molecule or their analogs.

At least difunctional or higher crosslinking agents are used in the reactive polymers. The crosslinking agents include, for example, melamine resin, epoxy resin, metal oxides, and the like. Examples of the metal oxides include basic metallic compounds such as $Al(OH)_3$, $Al(OOC.CH_3)_2(OOCH)$, $Al(OOC.CH_3)_2$, $ZrO(OCH_3)$, $Mg(OOC.CH_3)$, $Ca(OH)_2$, $Ba(OH)_3$, and the like that can be properly used.

The self-crosslinkable polymers are polymers that self-crosslink with each other by functional groups due to heating, and include, for example, glycidyl and carboxyl groups or N-methylol and carboxy groups.

The photo-curable liquid polymer may be, for example, oligomers or prepolymers such as polyester, epoxy resin, oxetane resin, polyacryl, polyurethane, polyimide, polyamide, polyamideimide, polyimide silicone, and the like.

Examples of monomer units constituting a photo-curable liquid polymer include monofunctional monomers and polyfunctional monomers of acrylates such as bisphenol A ethylene oxide-modified diacrylate, dipentaerythritol hexa(penta)acrylate, dipentaerythritol monohydroxy pentacrylate, dipropylene glycol diacrylate, trimethylolpropane triacrylate, glycerin propoxytriacrylate, 4-hydroxybutyl acrylate, 1,6-hexanediol diacrylate, 2-hydroxyethyl acrylate, 2-hydroxypropyl acrylate, isobornyl acrylate, polyethylene glycol diacrylate, pentaerythritol triacrylate, tetrahydrofurfuryl acrylate, trimethylolpropane triacrylate, tripropylene glycol diacrylate, and the like; methacrylates such as tetraethylene glycol dimethacrylate, alkyl methacrylates, allyl methacrylate, 1,3-butylene glycol dimethacrylate, n-butyl methacrylate, benzyl methacrylate, cyclohexyl methacrylate, diethylene glycol dimethacrylate, 2-ethylhexyl methacrylate, glycidyl methacrylate, 1,6-hexanediol dimethacrylate, 2-hydroxyethyl methacrylate, isobornyl methacrylate, lauryl methacrylate, phenoxyethyl methacrylate, t-butyl methacrylate, tetrahydrofurfuryl methacrylate, trimethylolpropane trimethacrylate, and the like; glycidyl ethers such as allylglycidyl ether, butylglycidyl ether, higher alcohol glycidyl ether, 1,6-hexanediolglycidyl ether, phenylglycidyl ether, stearylglycidyl ether, and the like; acryl (methacryl) amides such as diacetoneacrylamide, N,N-dimethylacrylamide, dimethylaminopropylacrylamide, dimethylaminopropylmethacrylamide, methacrylamide, N-methylolacrylamide, N,N-dimethylmethacrylamide, acryloylmorpholine, N-vinylformamide, N-methylacrylamide, N-isopropylacrylamide, N-t-butylacrylamide, N-phenylacrylamide, acryloylpiperizine, 2-hydroxyethyl acrylamide, and the like; vinyl ethers such as 2-chloroethylvinyl ether, cyclohexylvinyl ether, ethylvinyl ether, hydroxybutylvinyl ether, isobutylvinyl ether, triethyleneglycol vinyl ether, and the like; vinyl carboxylates such as vinyl butyrate, vinyl monochloroacetate, vinyl pivalate, and the like.

The photo-curable liquid polymer is cured with a photopolymerization initiator. The photopolymerization initiator can be, for example, acetophenones, benzophenones, Michler's benzoylbenzoates, α-amyloxime esters, tetramethylthiuram monosulfides, or thioxanthones. A photosensitizer such as n-butylamine, triethylamine, and tri-n-butylphosphine can be mixed.

Examples of cationic polymerization initiators include aryl diazonium salts, diaryl halonium salts, triphenyl sulfonium salts, silanol/aluminum chelate, α-sulfonyloxyketones, and the like.

Precursor compounds or monomers forming a binder resin may be contained in place of the above-described binder resin. The binder resin can be formed by polymerizing the precursor compounds or monomers.

In the conductive composition, additives may be contained as well as the binder resin. Additives which can be mixed with each component of the conductive composition are used, and examples of additives include a surface active agent, an antifoaming agent, a coupling agent, a neutralizing agent, an antioxidant, and the like.

Examples of surface active agents include an anionic surface active agent such as carboxylate, sulfonate, sulfate salt, phosphate salt, and the like; a cationic surface active agent such as an amine salt, a quaternary ammonium salt, and the like; an amphoteric surface active agent such as a carboxybetaine, an aminocarboxylate salt, an imidazolium betaine, and the like; and a nonionic surface active agent such as a polyoxyethylene alkylether, a polyoxyethylene glycerine fatty acid ester, an ethylene glycol fatty acid ester, a polyoxyethylene fatty acid amide, and the like.

Examples of antifoaming agents include a silicone resin, a polydimethylsiloxane, a silicone resin, and the like.

Examples of coupling agents include a silane coupling agent containing vinyl, amino, epoxy groups, and the like.

Examples of neutralizing agents include an alkali compound such as ammonia, sodium hydroxide, or the like and a nitrogen-containing compound such as primary amines, secondary amines, tertiary amines, and the like.

Examples of antioxidants include a phenolic antioxidant, an amine antioxidant, a phosphorus-based antioxidant, a sulfur-based antioxidant, saccharides, vitamins, and the like.

Since each conductive composition, antistatic coating material, and solid electrolyte layer of a capacitor contains a hydroxy group-containing aromatic compound, high conductivity and heat resistance are shown. It is considered that these properties can be obtained for the following reasons.

Since the $\pi$ conjugated conductive polymer is in a highly oxidized state, it is considered that radicals will be formed by oxidative degradation of a portion of the polymer due to the external environment such as heat, and then degradation progresses according to a radical chain reaction. On the other hand, the hydroxy group-containing aromatic compound has a strong interaction between the hydroxy groups and the aromatic ring, and tends to release hydrogen from the compound. Therefore, hydrogen released from the hydroxy group-containing aromatic compound can deactivate radicals formed by oxidative degradation of the $\pi$ conjugated conductive polymer. Accordingly, the radical chain reaction is stopped and progression of degradation is suppressed, and thus the heat resistance and stability should be high. This effect occurs when the aromatic compound contains two or more hydroxy groups.

The hydroxy group-containing aromatic compound tends to interact with anion groups in the polyanion. It is considered that this interaction can shorten the distance between polyanions, and accordingly, the distance between the $\pi$ conjugated conductive polymers, adsorbed on the polyanion by doping, each other can be also shortened. As a result, the energy for hopping, which is an electric conduction phenomenon between $\pi$ conjugated conductive polymers, is reduced, and thus the total electric resistance can be reduced (conductivity can increase).

(Production Methods)
(Conductive Composition)

An example of a production method of a conductive composition according to the present invention is explained.

In the production method of a conductive composition of this example, first, in a polymerization step, a precursor monomer forming a $\pi$ conjugated conductive polymer is dispersed or dissolved in a solvent in the presence of a polyanion to polymerize by a chemical oxidative polymerization. Specifically, a polyanion, a precursor monomer, and an oxidant and/or oxidative polymerization catalyst for polymerizing the precursor monomer by the chemical oxidative polymerization are prepared. The precursor monomer and oxidant and/or oxidative polymerization catalyst are added to the polyanion maintained at a constant temperature and are reacted for a predetermined time while stirring to polymerize the precursor monomer by the chemical oxidative polymerization. An operation method, a sequence of the operation, reaction conditions, and the like are not limited in the polymerization step.

A mixed solution having a predetermined concentration may be prepared by adding a solvent to the polyanion, precursor monomer, oxidant and/or oxidative polymerization catalyst beforehand.

When the $\pi$ conjugated conductive polymer is polymerized by the chemical oxidative polymerization, the main chain of the $\pi$ conjugated conductive polymer grows along the main chain of the polyanion and then the $\pi$ conjugated conductive polymer forms a bipolaron structure under the highly oxidized conditions. Accordingly, it is considered that anion groups of the polyanion are doped with the $\pi$ conjugated conductive polymer to form a salt of the polyanion and the $\pi$ conjugated conductive polymer. When the polyanion has sulfo groups, a salt of the polyanion strongly bonding with the $\pi$ conjugated conductive polymer can be formed. Since the $\pi$ conjugated conductive polymer is strongly attracted to the main chain of the polyanion, the $\pi$ conjugated conductive polymer arranged with regularity by growing along the main chain of the polyanion can be easily obtained.

In the polymerization step, a mixed solution containing the polyanion and the $\pi$ conjugated conductive polymer is obtained.

A reaction terminator to stop the polymerization reaction may be added, if necessary, after the polymerization step has been completed. Furthermore, excess oxidant and/or oxidative polymerization catalyst and reaction by-products may be removed and ion exchange may be carried out after the polymerization step has been completed.

Next, in an addition step, a predetermined amount of a hydroxy group-containing aromatic compound is added in the mixed solution obtained in the polymerization step and mixed so as to form a uniform solution.

As an addition process of the hydroxy group-containing aromatic compound, a process for adding the hydroxy group-containing aromatic compound as it is and a process for adding a solution in which the hydroxy group-containing aromatic compound is dissolved or dispersed in a solvent are exemplified. In view of the ease of mixing with the above-described mixed solution, the process for adding a solution in which the hydroxy group-containing aromatic compound is dissolved or dispersed in a solvent is preferred. Solvents for dissolving or dispersing the hydroxy group-containing aromatic compound are not especially limited and the above-described solvents can be used. Solvents may differ from the solvent used in the mixed solution.

Subsequently, in a filtration step, a conductive composition is obtained by partially removing free ions by an ultrafiltration method. In the production method of the conductive composition of the present invention, the filtration step is an optional step and may be omitted.

In the ultrafiltration method, a polymer membrane (an ultrafiltration membrane) formed with a constant bore diameter is provided on a porous material and the solution is circulated. The ultrafiltration membrane is inserted to produce a differential pressure between the circulated solution and the permeated solution; therefore, a part of solution at the circulated solution side penetrates to the permeated solution side and releases the pressure at the circulated solution side. Particles smaller than the bore diameter of the ultrafiltration membrane and a part of the dissolved ions or the like contained in the circulated solution are transferred to the permeated solution side based on the above phenomenon to be removed. This method is a dilution method and impurities can be easily removed by repeating this dilution.

The ultrafiltration membrane to be used is suitably selected depending upon the diameter of particles to be removed and ion species, and an ultrafiltration membrane having a range of molecular weight cut off of 1000 to 100000 is preferably used.

Since the obtained π conjugated conductive polymer contains a grown π-conjugate system in the main chain, π conjugated conductive polymers generally have insoluble and infusible properties. In the π conjugated conductive polymer solution obtained by dissolution or dispersion, since the π conjugated conductive polymer is self-coordinated by removing solvents, heating, doping, or the like when forming a film, the π conjugated conductive polymer may be insoluble. Therefore, solvents should be appropriately selected.

The above-described production method of the conductive composition comprises a polymerization step for polymerizing a precursor monomer forming a π conjugated conductive polymer in the presence of polyanion by a chemical oxidative polymerization, and an addition step for adding a hydroxy group-containing aromatic compound, and then a conductive composition comprising the π conjugated conductive polymer, the polyanion, and the hydroxy group-containing aromatic compound is obtained. Since the conductive composition comprises the hydroxy group-containing aromatic compound, superior conductivity and stability are shown.

(Antistatic Coating Material)

To produce an antistatic coating material, first, a polyanion is dissolved in a solvent for dissolving it, a precursor monomer of a π conjugated conductive polymer and, as necessary, a dopant are added and fully stirred and mixed. Next, an oxidant is added dropwise into the obtained mixture to advance a polymerization and obtain complexes of the polyanion and π conjugated conductive polymer. Subsequently, the oxidant, residual monomer, and by-products are removed from the complexes to purify, and then, dissolved in an appropriate solvent. A hydroxy group-containing aromatic compound and, as necessary, a dopant and a binder resin are added to obtain an antistatic coating material.

Purification methods are not specially limited, for example, reprecipitation method, ultrafiltration method or the like can be used. Among these, the ultrafiltration method is simple and thus preferable. The ultrafiltration method is a method wherein a liquid in a solution is permeated and filtered through a porous ultrafiltration membrane while circulating the solution on the ultrafiltration membrane. In this method, the ultrafiltration membrane is inserted to produce a differential pressure between the circulated solution and the permeated solution; therefore, a part of solution at the circulated solution side penetrates to the permeated solution side and release the pressure at the circulated solution side. Particles smaller than the bore diameter of the ultrafiltration membrane and a part of dissolved ions transfer to the permeated solution side according to the penetration of this circulated solution. Therefore, these particles and dissolved ions can be removed. The ultrafiltration membrane to be used is properly selected depending upon diameter of particles to be removed and ion species, and the ultrafiltration membrane having a range of molecular weight cut off of 1000 to 100000 is preferably used.

(Antistatic Coating)

An antistatic coating is formed by applying an antistatic coating material on a base. Examples of methods for applying the antistatic coating material include dipping, comma coating, spray coating, roll coating, gravure printing, and the like. Bases are not specially limited, and resin moldings easy to cause static electricity, especially resin films such as polyester film, triacetyl cellulose (TAC) film, and the like are suitable.

After the application, the solvent is removed by heating, or the coating may be cured by heat or light. As heating methods in case of heating, for example, common methods such as hot-air heating or infrared heating can be adopted. As methods for irradiating a light in case of forming a coating film by photohardening, for example, a method for irradiating ultraviolet ray from light sources such as ultrahigh-pressure mercury vapor lamp, high-pressure mercury vapor lamp, low-pressure mercury vapor lamp, carbon arc, xenon arc, metal halide lamp, and the like can be adopted.

Since the antistatic coating comprises the hydroxy group-containing aromatic compound, the conductivity remarkably increases and the degradation of the π conjugated conductive polymer is suppressed.

More specifically, the conductivity is about 0.001 to 100 S/cm when no hydroxy group-containing aromatic compound is contained, on the other hand, the conductivity is about 10 to 2000 S/cm when a hydroxy group-containing aromatic compound is contained.

When the antistatic coating is used in an optical field, especially, used for an optical filter and an optical information recording medium described later, the transparency is preferably high. More specifically, the total light transmittance (JIS Z 8701) is preferably 85% or above, more preferably 90% or above, and especially preferably 96% or above.

The haze (JIS K 6714) is preferably 5% or below, more preferably 3% or below, and especially preferably 1% or below.

The surface hardness (pencil hardness) of the antistatic coating is preferably HB or harder when the antistatic coating also serves as a hard coat layer. The pencil hardness can be adjusted by the thickness of coating film.

It is preferable that the surface resistance of the antistatic coating is properly adjusted in accordance with optical characteristics. Usually, if the surface resistance is about $1 \times 10^3 \Omega$ to $1 \times 10^{12} \Omega$, it is applicable to the antistatic purpose.

The light transmittance, haze, and surface resistance of the coating film can be adjusted by the thickness of the coating film.

The total light transmittance, haze, and surface resistance of the coating film can be adjusted by the thickness of the antistatic coating. It is preferable that a binder resin is not contained when a low surface resistance value is desired. However, it is preferable that a binder resin is contained to lower the cost or improve the adhesion to a base.

(Antistatic Film)

An antistatic film has a film base and the above antistatic coating formed on at least one side of the film base.

Examples of film bases include low-density polyethylene film, high-density polyethylene film, ethylene-propylene copolymer film, polypropylene film, ethylene-vinylacetate copolymer film, ethylene-methyl methacrylate copolymer film, polyethylene terephthalate (PET) film, polybutylene terephthalate (PBT) film, polyethylene naphthalate (PEN) film, polyimide film, 6-nylon film, 6,6-nylon film, polymethyl methacrylate film, polystyrene film, styrene-acrylonitrile-butadiene copolymer film, polyacrylonitrile film, cellulose triacetate (TAC) film, cellulose propionate film, polyvinyl chloride film, polyvinylidene chloride film, polyvinylidene fluoride film, polytetrafluoroethylene film, polyvinyl alcohol film, ethylene-vinyl alcohol copolymer film, polycarbonate film, polysulfone film, polyether sulfone film, polyether ether ketone film, polyphenylene oxide film, and the like.

The surface of these film bases are usually oleophilic, when an antistatic coating material dissolved in an aqueous solvent is applied, the application is difficult. Therefore, when an antistatic coating material dissolved in an aqueous solvent is applied, it is preferable to give etching treatments such as sputtering, corona discharge, flame, ultraviolet irradiation, electron ray irradiation, chemical reaction, oxidation, and the like or hydrophilic treatments such as primer coating, and the like. Moreover, the surface may also be dust removed and cleaned by solvent washing, ultrasonic washing, or the like.
(Optical Filter)

An embodiment example of an optical filter of the present invention is explained.

The optical filter of this embodiment example is shown in FIG. 1. This optical filter 1 comprises a film base 10, an antistatic coating 20 formed on the film base 10, and an antireflecting layer 30 formed on the antistatic coating 20. The antistatic coating 20 in this optical filter 1 functions as a hard coat layer.

When the optical filter 1 is provided on the surface of a display, a transparent adhesive layer is provided on the surface of the film base 10 in the optical filter 1, and the optical filter 1 and the surface of the display are provided via the adhesive layer. Various plastic films having transparency can be used as the film base 10. Examples of the transparent plastic films include films made of polyethylene terephthalate, polyimide, polyether sulfone, polyether ether ketone, polycarbonate, polypropylene, polyamide, acrylamide, cellulose propionate, and the like.

Moreover, it is preferable that etching treatments such as sputtering, corona discharge, flame, ultraviolet irradiation, electron ray irradiation, chemical reaction, oxidation, and the like or hydrophilic treatments such as primer coating are given to the surface of film base 10. If such treatments are given to the surface, the adhesion to the antistatic coating 20 can be further increased.

Furthermore, the surface of film base 10 may also be dust removed or cleaned by solvent washing, ultrasonic washing, or the like, as necessary, before the antistatic coating 20.

The antistatic coating 20 is a membrane formed from an antistatic coating material as described above, and the membrane functions as a hard coat layer. Accordingly, as described above, the surface hardness (pencil hardness) of this antistatic coating 20 is preferably HB or harder. The total light transmittance (JIS Z 8701) of antistatic coating 20 is preferably 85% or above, more preferably 90% or above, and especially preferably 96% or above for optical purposes. The haze (JIS K 6714) is preferably 5% or below, more preferably 3% or below, and especially preferably 1% or below.

The antireflecting layer 30 is a layer for preventing the reflection of light. This layer may be a single layer or a multilayer. In case of a single layer, the refractive index is preferably in a range of 1.38 to 1.45, and the thickness of optical film is preferably in a range of 80 to 100 nm.

The antireflecting layer 30 can be formed by either dry processes or wet processes. Examples of dry processes include physical deposition processes such as electron-beam vapor deposition process, dielectric heating vapor deposition process, resistance heating vapor deposition process, sputtering process, ion plating process, and the like, and plasma CVD process. When the antireflecting layer 30 is formed by the dry processes, for example, inorganic compounds such as silicon oxide, magnesium fluoride, niobium oxide, titanium oxide, tantalum oxide, aluminum oxide, zirconium oxide, indium oxide, tin oxide, and the like can be used as components of the antireflecting layer 30.

As wet processes, for example, processes wherein a coating containing curable compounds is applied by well-known methods such as comma coating, spray coating, roll coating, gravure printing, and the like are given. When the antireflecting layer 30 is formed by the wet processes, for example, fluorine compounds such as fluorine-containing organic compounds, fluorine-containing organosilicon compounds, fluorine-containing inorganic compounds, and the like can be used as a curable compound.

In the optical filter 1, an antifouling layer may be further provided on the antireflecting layer 30. If the antifouling layer is provided, it prevents the adherence of dust and dirt or facilitates to remove dust and dirt even if they adhere to.

The antifouling layer is not specially limited if it does not hinder the antireflection function of the antireflecting layer 30, can show high water repellence and high oil repellence, and prevent the adherence of contaminants. The antifouling layer may be a layer made of organic compounds or a layer made of inorganic compounds. For example, a layer containing organosilicon compounds with a perfluorosilane group or a fluorocycloalkyl group, or a layer containing organofluorine compounds can be used.

The processes for forming the antifouling layer can be properly selected according to their kinds, for example, physical vapor deposition processes or chemical vapor deposition processes such as deposition process, sputtering process, ion plating process; vacuum processes such as plasma polymerization process; microgravure process, screen coating process, dip coating process, and the like can be adopted.

The optical filter 1 described above is excellent in transparency and also excellent in adhesion to the film base 10 because the antistatic coating 20 protecting the film base 10 is formed and the antistatic coating 20 is formed from the above antistatic coating materials. Moreover, this optical filter 1 is a filter excellent in stability of antistatic property and its surface is hard to be adhered by dust.

Then, such an optical filter 1 is suitably used as an antireflecting film, an infrared absorption film, an electromagnetic wave absorption film, and the like for liquid crystal displays and plasma displays.

Moreover, the optical filter of the present invention is not limited to the above-mentioned embodiment examples, if the optical filter has an antistatic coating formed from the above antistatic coating materials.

For example, a polarizing plate can also be used in place of the film base. For example, a polarizing plate is obtained by laminating protecting films on one side or both sides of a polyvinyl alcohol resin film in which a dichromic colorant is absorbed and oriented. As dichromic colorants, iodine, dichromic dyes can be used. Such an optical filter can be provided at the uppermost surface of a liquid crystal display.
(Optical Information Recording Medium)

An embodiment example of an optical information recording medium of the present invention is explained.

Figure 2:
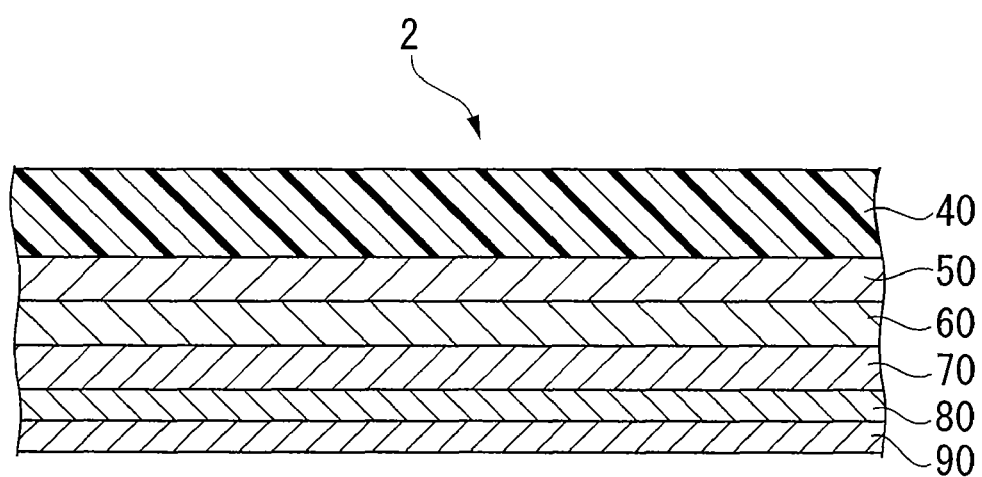
FIG. 2 is a cross-sectional view showing an embodiment of the optical information recording medium according to the present invention.

The optical information recording medium of this embodiment example is shown in FIG. 2. This optical information recording medium 2 is a rewrite-type disk and has a structure in which a disk-like transparent resin base 40, a first dielectric layer 50, an optical information recording layer 60, a second dielectric layer 70, a metal reflecting layer 80, and an antistatic coating 90 are formed in order.

As materials constructing the first dielectric layer 50 and the second dielectric layer 70, for example, inorganic materials such as SiN, SiO, $SiO_2$, $Ta_2O_5$, or the like can be used. These dielectric layers are formed in a thickness of 10 to 500 nm by well-known means such as vacuum vapor deposition process, sputtering process, ion plating process, and the like.

As materials constructing the optical information recording layer 60, for example, inorganic photomagnetic recording materials such as Tb—Fe, Tb—Fe—Co, Dy—Fe—Co, Tb—Dy—Fe—Co, and the like; inorganic phase-change recording materials such as TeOx, Te—Ge, Sn—Te—Ge, Bi—Te—Ge, Sb—Te—Ge, Pb—Sn—Te, Tl—In—Se, and the like; and organic colorants such as cyanine colorants, polymethine colorants, phthalocyanine colorants, merocyanine colorants, azulene colorants, squalium colorants, and the like are used.

When the optical information recording layer 60 is made of inorganic photomagnetic recording materials, it can be formed in a thickness of 10 to 999 nm by well-known means such as vacuum vapor deposition process, sputtering process, ion plating process, and the like. When the optical information recording layer 60 is made of organic colorants, a solution given by dissolving an organic colorant in a solvent such as acetone, diacetone alcohol, ethanol, methanol, and the like can be formed in a thickness of 10 to 999 nm by well-known printing process or coating process.

The metal reflecting layer 80 exhibits light reflectivity and is composed of metals such as Al, Cr, Ni, Ag, Au, and the like and oxides thereof, nitrides thereof, and the like separately or by combining two or more kinds of them. This metal reflecting layer 80 is formed in a thickness 2 to 200 nm by sputtering or vacuum deposition process.

The antistatic coating 90 is formed from the above antistatic coating materials. Since the surface hardness of the antistatic coating 90 is set to HB or harder, the antistatic coating 90 can prevent surface scratch of the optical information recording medium 2 and prevent oxidation of the metal reflecting layer 80 as well as the adherence of dust due to static electricity.

The thickness of antistatic coating 90 is preferably 3 to 15 μm. If the thickness is thinner than 3 μm, the formation of a uniform membrane tends to become difficult, sufficient antistatic property, surface scratch resistance and oxidation resistance of the metal reflecting layer 80 sometimes cannot be displayed. On the other hand, if the thickness is thicker than 15 μm, it is feared that the internal stress increases and mechanical properties of the optical information recording medium 2 deteriorate.

The antistatic coating 90 is formed by applying an antistatic coating material on the metal reflecting layer 80 by well-known methods such as comma coating, spray coating, roll coating, gravure printing, and the like, and then drying the solvent or curing by heat or UV irradiation.

In the optical information recording medium 2 explained above, the antistatic coating 90 protecting the optical information recording layer 60 and the metal reflecting layer 80 is formed, and the antistatic coating 90 is formed from the above antistatic coating material. Accordingly, the antistatic coating 90 is excellent in transparency in the range of 780 nm and 635 nm which is a range of wavelength of read-only laser because the haze is low and the light transmittance is high. Moreover, the dust adherence due to static electricity is suppressed and the recording reading errors and writing errors are prevented because the antistatic coating 90 has the antistatic property.

Moreover, the optical information recording medium of the present invention is not limited to the above-mentioned embodiment example; the optical information recording medium may also be a postscript-type disk. For example, the postscript-type disk has a structure in which a transparent resin base (organic base), an optical information recording layer, a reflecting metal layer and an antistatic coating are formed in order.

(Capacitor)

An embodiment example of a capacitor of the present invention and its production method is explained.

Figure 3:
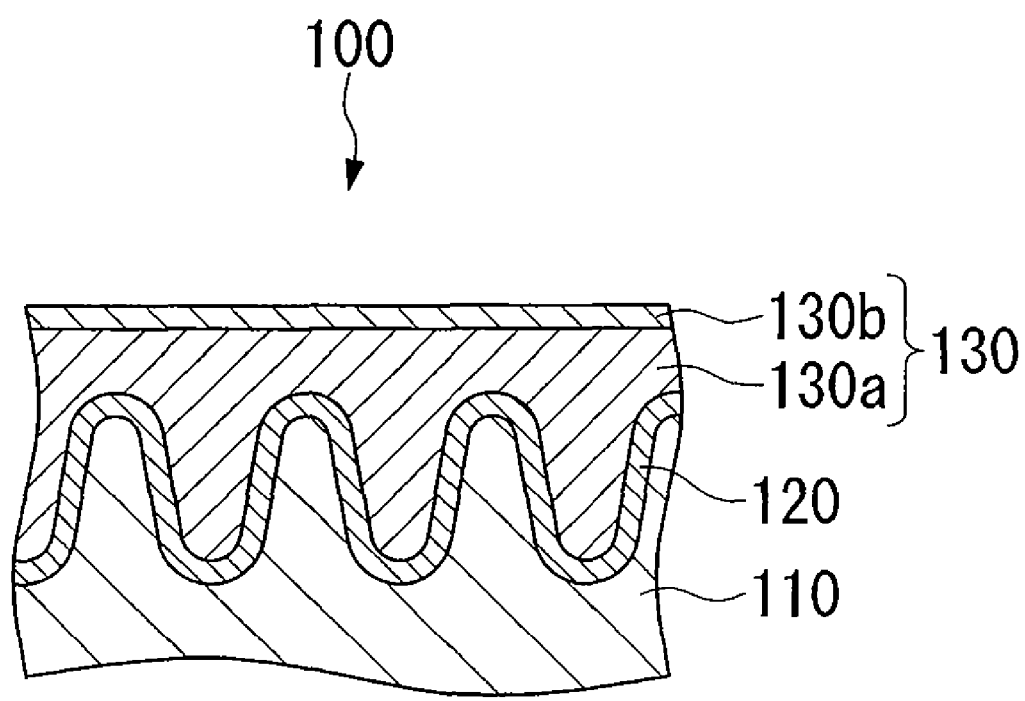
FIG. 3 is a cross-sectional view showing an embodiment of the capacitor according to the present invention.

FIG. 3 is a diagram showing the construction of a capacitor of this embodiment example. This capacitor 100 is schematically constructed by having an anode 110 composed of a porous valve metal body, a dielectric layer 120 formed by oxidizing the surface of anode 110, and a cathode formed on the dielectric layer 120.

<Anode>

Examples of valve metals forming the anode 110 include aluminum, tantalum, niobium, titanium, hafnium, zirconium, zinc, tungsten, bismuth, antimony, and the like. Among these, aluminum, tantalum, and niobium are preferably used. These valve metals can form a densely and durable dielectric oxide film (dielectric layer) by electrolytic oxidation; therefore, the capacity of capacitor can be stably increased.

As specific examples of anode 110, an anode obtained by etching an aluminum foil to increase the surface area and then oxidizing its surface, an anode obtained by oxidizing the surface of sintered body of tantalum particles or niobium particles and then forming pellets, and the like are given. The irregularities are formed on the surface of anodes thus treated.

<Dielectric Layer>

The dielectric layer 120 is formed, for example, by anodic oxidation of the surface of metal body 110 in an electrolyte such as an aqueous solution of ammonium adipate. Accordingly, as shown in FIG. 3, the irregularities are similarly formed at the surface of the dielectric layer 120 as the anode 110.

<Cathode>

A cathode 130 comprises a solid electrolyte layer 130a and a conductive layer 130b composed of carbon, silver, aluminum, and the like and formed on the solid electrolyte layer 130a. The solid electrolyte layer 130a comprises a π conjugated conductive polymer, a polyanion, and a hydroxy group-containing aromatic compound.

When the conductive layer 130b is constructed of carbon, silver, and the like, it is formed from a conductive paste containing a conductor such as carbon, silver, and the like. When the conductive layer 130b is constructed of aluminum, it is formed from an aluminum foil.

Moreover, a separator can be provided between the solid electrolyte layer 130a and the conductive layer 130b as necessary.

A production method of the capacitor is a method wherein a conductive polymer solution is applied to the surface of a dielectric layer 120 of a capacitor intermediate having the anode 110 composed of a porous valve metal body and the dielectric layer 120 of an oxide film formed by oxidizing the surface of the anode 110 to form the solid electrolyte layer 130a.

The conductive polymer solution in this production method contains a π conjugated conductive polymer, a polyanion, a hydroxy group-containing aromatic compound, and a solvent.

To prepare the conductive polymer solution, first, the polyanion is dissolved in a solvent which can dissolve the polyanion, a precursor monomer such as aniline, pyrrole, thiophene, and the like forming the π conjugated conductive polymer is added into the obtained solution. Next, an oxidant is added to polymerize the precursor monomer, subsequently, excess oxidant and precursor monomer are separated and purified. Then, the hydroxy group-containing aromatic compound is added to obtain the conductive polymer solution.

Solvents contained in the conductive polymer solution are not specially limited, examples of solvents include alcohol solvents such as methanol, ethanol, isopropyl alcohol (IPA), and the like; amide solvents such as N-methylpyrrolidone (NMP), dimethylacetamide (DMAc), dimethylformamide (DMF), and the like; ketone solvents such as methyl ethyl ketone (MEK), acetone, cyclohexane, and the like; ester solvents such as ethyl acetate, butyl acetate, and the like; toluene, xylene, water, and the like. They may be used separately or used by mixing. Water and alcohol solvents with a low environmental load are preferable among them from a recent viewpoint of environmental protection.

Examples of coating methods of the conductive polymer solution include well-known methods such as coating, dipping, spraying, and the like. Examples of drying methods include well-known methods such as hot-air drying, and the like.

After the solid electrolyte layer 130a is formed, the conductive layer 130b can be formed by well-known methods such as a method using a carbon paste or silver paste, and a method providing the cathode at the opposed side via a separator.

In the solid electrolyte layer 130a, since the particle diameter of the π conjugated conductive polymer is large, the π conjugated conductive polymer does not reach to the deepest part of fine voids at the surface of dielectric layer of the capacitor intermediate product, sometimes it becomes difficult to derive a capacity. Therefore, it is preferable that the capacity is supplemented by impregnating an electrolyte as necessary after the solid electrolyte layer 130a is formed.
(Electrolytes)

Electrolytes are not specially limited if they have a high conductivity, and well-known electrolytes are dissolved in well-known solvents.

Examples of solvents in the electrolytes include alcohol solvents such as ethylene glycol, diethylene glycol, propylene glycol, 1,4-butanediol, glycerin, and the like; lactone solvents such as γ-butyrolactone, γ-valerolactone, δ-valerolactone, and the like; amide solvents such as N-methylformamide, N,N-dimethylformamide, N-methylacetamide, N-methylpyrrolidinone, and the like; nitrile solvents such as acetonitrile, 3-methoxypropionitrile, and the like; water and the like.

Examples of the electrolytes include electrolytes with organic acids such as adipic acid, glutaric acid, succinic acid, benzoic acid, isophthalic acid, phthalic acid, terephthalic acid, maleic acid, toluic acid, enanthic acid, malonic acid, formic acid, decane dicarboxylic acids such as 1,6-decane dicarboxylic acid, 5,6-decane dicarboxylic acid, and the like, octane dicarboxylic acids such as 1,7-octane dicarboxylic acid, and the like, azelaic acid, sebacic acid, and the like, or inorganic acids such as boric acid, polyalcohol complexes of boric acid obtained from boric acid and polyalcohols, phosphoric acid, carbonic acid, silicic acid, and the like as anion component; and primary amines (methylamine, ethylamine, propylamine, butylamine, ethylenediamine, and the like), secondary amines (dimethylamine, diethylamine, dipropylamine, methylethylamine, diphenylamine, and the like), tertiary amines (trimethylamine, triethylamine, tripropylamine, triphenylamine, 1,8-diazabicyclo(5,4,0)-undecene-7, and the like), tetraalkylammoniums (tetramethylammonium, tetraethylammonium, tetrapropylammonium, tetrabutylammonium, methyltriethylammonium, dimethyldiethylammonium, and the like), and the like as cation component.

The above-mentioned production method involves simple processes, is suited to mass production, and is low-cost because the solid electrolyte layer is formed by coating a conductive polymer solution and then drying. Furthermore, since the conductive polymer solution contains a π conjugated conductive polymer, a polyanion, and a hydroxy group-containing aromatic compound, the degradation of the π conjugated conductive polymer in the solid electrolyte layer is suppressed and the hopping energy is reduced. Therefore, the conductivity of the solid electrolyte layer can be increased, and thus the performance of the capacitor can be improved.

EXAMPLES

Examples of the present invention are shown below; however, the present invention is not limited to the following examples.

Preparation Example 1

Synthesis of Poly(Ethyl Methacrylate Sulfonic Acid) (PMAS)

216 g of ethyl methacrylate sodium sulfonate was dissolved in 1000 ml of ion-exchanged water, 1.14 g of ammonium persulfate previously dissolved in 10 ml of water beforehand was added dropwise over 20 minutes while stirring at 80° C., and the mixture was continuously stirred for an additional 12 hours.

1000 ml of sulfuric acid diluted to 10% by weight was added to the obtained poly (ethyl methacrylate sodium sulfonate) solution, about 1000 ml of the solution was removed by an ultrafiltration method, 2000 ml of ion-exchanged water was added to the residue, and about 2000 ml of the solution was removed by the ultrafiltration method. The above ultrafiltration operation was repeated three times.

Subsequently, about 2000 ml of ion-exchanged water was added to the obtained filtrate and about 2000 ml of the solution was removed by the ultrafiltration method. This ultrafiltration operation was repeated three times.

The ultrafiltration conditions were as follows (the same was applied to the other examples).

Molecular cutoff of the ultrafiltration membrane: 30000
Cross flow system
Feed rate: 3000 ml/min.
Membrane partial pressure: 0.12 Pa
Water in the obtained solution was removed under reduced pressure to obtain a colorless solid material.

Preparation Example 2

Synthesis of Polystyrene Sulfonic Acid 206 g of sodium styrene sulfonate was dissolved in 1000 ml of ion-exchanged water, 1.14 g of ammonium persulfate previously dissolved in 10 ml of water beforehand was added dropwise over 20 minutes while stirring at 80° C., and the mixture was continuously stirred for an additional 12 hours.

1000 ml of sulfuric acid diluted to 10% by weight was added to the obtained poly(sodium styrene sulfonate) solution, about 1000 ml of the solution was removed by the ultrafiltration method, 2000 ml of ion-exchanged water was added to the residue, and about 2000 ml of the solution was removed by the ultrafiltration method. The above ultrafiltration operation was repeated three times.

Subsequently, about 2000 ml of ion-exchanged water was added to the obtained filtrate and about 2000 ml of the solution was removed by the ultrafiltration method. This ultrafiltration operation was repeated three times.

Water in the obtained solution was removed under reduced pressure to obtain a colorless solid material.

Preparation Example 3

14.2 g of 3,4-ethylenedioxythiophene and a solution obtained by dissolving 36.7 g of polystyrene sulfonic acid in 2000 ml of ion-exchanged water were mixed at 20° C.

This mixed solution was maintained to 20° C., 29.64 g of ammonium persulfate dissolved in 200 ml of ion-exchanged water and 8.0 g of an oxidation catalyst solution of ferric sulfate were slowly added while stirring, and then the mixture was stirred and reacted for 3 hours.

2000 ml of ion-exchanged water was added to the obtained solution, and about 2000 ml of solution was removed by the ultrafiltration method. This operation was repeated three times.

200 ml of sulfuric acid diluted to 10% by weight and 2000 ml of ion-exchanged water were added to the obtained solution, about 2000 ml of the solution was removed by the ultrafiltration method, 2000 ml of ion-exchanged water was added to the residue, and about 2000 ml of the solution was removed by the ultrafiltration method. The above ultrafiltration operation was repeated three times.

Subsequently, 2000 ml of ion-exchanged water was added to the obtained filtrate and about 2000 ml of the solution was removed by the ultrafiltration method. This ultrafiltration operation was repeated five times and about 1.5% by weight of a blue solution of polystyrene sulfonic acid-doped poly(3,4-ethylenedioxythiophene) (PSS-PEDOT) was obtained. It was taken as a π conjugated conductive polymer solution A.

Example 1

1.0 g of potassium hydroquinone sulfonate was added to 100 g of the π conjugated conductive polymer solution A obtained in Preparation Example 3 and the mixture was uniformly dispersed to obtain a conductive composition solution.

The conductive polymer solution was uniformly coated on a glass and dried in an oven of 150° C. to form a coating film. Electric characteristics of the coating film were evaluated by the following evaluation methods. The results are shown in Table 1.

TABLE 1

|  | Electric conductivity (S/cm) | Retention rate of electric conductivity depending on heat (%) | Rate of change of electric conductivity depending on humidity (%) |
|---|---|---|---|
| Example 1 | 98 | 67.5 | −3.2 |
| Example 2 | 56 | 53.5 | 11.3 |
| Example 3 | 276 | 81.6 | 2.5 |
| Example 4 | 132 | 86.4 | −5.5 |
| Example 5 | 653 | 91.3 | 3.4 |
| Example 6 | 283 | 89.5 | 3.3 |
| Example 7 | 578 | 92.8 | 3.8 |
| Example 8 | 45 | 45.4 | 5.4 |
| Example 9 | 32 | 52.6 | 7.3 |
| Example 10 | 420 | 88.2 | 3.4 |
| Comparative Example 1 | 0.8 | 2.5 | −350 |
| Comparative Example 2 | 2.7 | 8.9 | −490 |
| Comparative Example 3 | 5.8 | 10.3 | −487 |
| Comparative Example 4 | 4.5 | 0.8 | −386 |

(Evaluation Method)

Electric conductivity (S/cm): The electric conductivity of the coating film was measured by a LORESTA (manufactured by Mitsubishi Chemical Corporation). The retention rate of electric conductivity depending on heat (%): The electric conductivity $R_{25B}$ of the coating film at a temperature of 25° C. was measured, the coating film after measurement was placed under an environment of 125° C. for 300 hours, then the coating film was returned to the temperature of 25° C. and the electric conductivity $R_{25A}$ was measured. The retention rate of electric conductivity depending on heat was calculated by the following formula. The retention rate of electric conductivity depending on heat is an indicator of heat resistance.

Retention rate of electric conductivity depending on heat (%)=100×$R_{25A}$/$R_{25B}$ Rate of Change of Electric Conductivity Depending on Humidity (%):

The electric conductivity $R_{25B}$ of the coating was measured at 25° C. and at a humidity of 60% RH. Then, the coating was allowed to stand at 180° C. and 90% RH for 200 hours. The temperature of the coating was returned to 25° C. and 60% RH and the electric conductivity $R_{25A}$ was measured. The obtained values were applied to the following equation to obtain a rate of change of electric conductivity depending on humidity. The rate of change of electric conductivity depending on humidity is an indicator of moisture stability.

Rate of change of electric conductivity depending on humidity (%)=100×($R_{25B}$−$R_{25A}$)/$R_{25B}$ Example 2

A coating film of the conductive composition was similarly obtained and evaluated as in Example 1 except that 0.48 g of hydroquinone was added in place of potassium hydroquinone sulfonate in Example 1. The results are shown in Table 1.

Example 3

A coating film of the conductive composition was similarly obtained and evaluated as in Example 1 except that the amount of potassium hydroquinone sulfonate added in Example 1 was changed from 1.0 g to 2.0 g. The results are shown in Table 1.

Example 4

A coating film of the conductive composition was similarly obtained and evaluated as in Example 1 except that the amount of potassium hydroquinone sulfonate added in Example 1 was changed from 1.0 g to 6.0 g. The results are shown in Table 1.

Example 5

A coating film of the conductive composition was similarly obtained and evaluated as in Example 1 except that 1.5 g of 1,2,3-trihydroxybenzene was added in place of potassium hydroquinone sulfonate in Example 1. The results are shown in Table 1.

Preparation Example 4

14.2 g of 3,4-ethylenedioxythiophene and a solution obtained by dissolving 38.8 g of poly(ethyl methacrylate sulfonic acid) in 2000 ml of ion-exchanged water were mixed at 20° C.

This mixed solution was maintained at 20° C., 29.64 g of ammonium persulfate dissolved in 200 ml of ion-exchanged water and 8.0 g of an oxidation catalyst solution of ferric sulfate were slowly added while stirring, and then the mixture was stirred and reacted for 3 hours.

2000 ml of ion-exchanged water was added to the obtained solution, and about 2000 ml of solution was removed by the ultrafiltration method. This operation was repeated three times.

200 ml of sulfuric acid diluted to 10% by weight and 2000 ml of ion-exchanged water were added to the obtained solution, about 2000 ml of the solution was removed by the ultrafiltration method, 2000 ml of ion-exchanged water was added to the residue, and about 2000 ml of the solution was removed by the ultrafiltration method. The above ultrafiltration operation was repeated three times.

Subsequently, 2000 ml of ion-exchanged water was added to the obtained filtrate and about 2000 ml of the solution was removed by the ultrafiltration method. This ultrafiltration operation was repeated five times and about 1.5% by weight of a blue solution of poly(ethyl methacrylate sulfonic acid)-doped poly(3,4-ethylenedioxythiophene) (PMAS-PEDOT) was obtained. It was taken as a π conjugated conductive polymer solution B.

Example 6

2.0 g of potassium hydroquinone sulfonate which was dissolved in 5 ml of water beforehand was added to 100 g of the π conjugated conductive polymer solution B obtained in Preparation Example 4 and the mixture was uniformly dispersed to obtain a conductive composition solution.

The conductive polymer solution was uniformly coated on a glass and dried in an oven of 150° C. to form a coating film. Electric characteristics of the coating film were evaluated as in Example 1. The results are shown in Table 1.

Example 7

A coating film of the conductive composition was similarly obtained and evaluated as in Example 6 except that 1.5 g of 1,2,3-trihydroxybenzene was added in place of potassium hydroquinone sulfonate in Example 6. The results are shown in Table 1.

Preparation Example 5

6.8 g of pyrrole and a solution obtained by dissolving 38.8 g of poly(ethyl methacrylate sulfonic acid) in 2000 ml of ion-exchanged water were mixed and cooled to 0° C.

This mixed solution was maintained at 0° C., 29.64 g of ammonium persulfate dissolved in 200 ml of ion-exchanged water and 8.0 g of an oxidation catalyst solution of ferric sulfate were slowly added while stirring, and then the mixture was stirred for 3 hours.

2000 ml of ion-exchanged water was added to the obtained solution, and about 2000 ml of solution was removed by the ultrafiltration method. This operation was repeated three times.

200 ml of sulfuric acid diluted to 10% by weight and 2000 ml of ion-exchanged water were added to the obtained solution, about 2000 ml of the solution was removed by the ultrafiltration method, 2000 ml of ion-exchanged water was added to the residue, and about 2000 ml of the solution was removed by the ultrafiltration method. The above ultrafiltration operation was repeated three times.

Subsequently, 2000 ml of ion-exchanged water was added to the obtained filtrate and about 2000 ml of the solution was removed by the ultrafiltration method. This ultrafiltration operation was repeated five times and about 1.5% by weight of a blue solution of poly(ethyl methacrylate sulfonic acid)-doped polypyrrole (PMAS-PPY) was obtained. It was taken as a π conjugated conductive polymer solution C.

Example 8

2.0 g of potassium hydroquinone sulfonate which was dissolved in 5 ml of water beforehand was added to 100 g of the π conjugated conductive polymer solution C obtained in Preparation Example 5 and the mixture was uniformly dispersed to obtain a conductive composition solution.

The conductive polymer solution was uniformly coated on a glass and dried in an oven of 150° C. to form a coating film. Electric characteristics of the coating film were evaluated as in Example 1. The results are shown in Table 1.

Example 9

A coating film of the conductive composition was similarly obtained and evaluated as in Example 8 except that 1.5 g of 1,2,3-trihydroxybenzene was added in place of potassium hydroquinone sulfonate in Example 6. The results are shown in Table 1.

Example 10

1.5 g of 1,2,3-trihydroxybenzene was added to 100 g of the π conjugated conductive polymer solution A obtained in Preparation Example 3.

Furthermore, 9 g of an aqueous polyester containing solid content of 25% by weight (brand name: PLAS COAT Z-448D, manufactured by Goo Chemical Co., Ltd.) was added to the obtained solution and the mixture was uniformly dispersed to obtain a conductive composition solution.

The conductive polymer solution was uniformly coated on a glass and dried in an oven of 150° C. to form a coating film. Electric characteristics of the coating film were evaluated as in Example 1. The results are shown in Table 1.

Comparative Example 1

6.8 g of pyrrole and a solution obtained by dissolving 10.8 g of polyacrylic acid in 1000 ml of ion-exchanged water were mixed and cooled to 0° C.

This mixed solution was maintained at 0° C., 29.64 g of ammonium persulfate dissolved in 200 ml of ion-exchanged water and 8.0 g of an oxidation catalyst solution of ferric sulfate were slowly added while stirring, and then the mixture was stirred for 3 hours.

The obtained solution was controlled to pH 10 with 25% by weight of aqueous ammonia, and then the solid content was precipitated with isopropyl alcohol and filtered. The filtrate was washed with ion-exchanged water and this operation was repeated three times. The filtrate was redispersed in 1000 ml of ion-exchanged water to obtain a polyacrylic acid-polypyrrole colloidal solution.

The obtained polyacrylic acid-polypyrrole colloidal solution was coated on a glass and dried in an oven of 150° C. to form a coating film. Electric characteristics of the coating film were evaluated as in Example 1. The results are shown in Table 1.

Comparative Examples 2 to 4

The π conjugated conductive polymer solution A obtained in Preparation Example 3 (Comparative Example 2), the π conjugated conductive polymer solution B obtained in Preparation Example 4 (Comparative Example 3), and the π conjugated conductive polymer solution C obtained in Preparation Example 5 (Comparative Example 4) were coated on a glass and dried in an oven of 150° C. to form coating films of the conductive compositions. Electric characteristics of the coating films were evaluated as in Example 1. The results are shown in Table 1.

The conductive compositions of Examples 1 to 10 each containing a hydroxy group-containing aromatic compound had high conductivity and also had superior heat stability and moisture stability.

On the other hand, the conductive compositions of Comparative Examples 1 to 4 each containing no hydroxy group-containing aromatic compound had low conductivity and also inferior heat stability and moisture stability.

Example 11

A coating film of the conductive composition was similarly obtained and evaluated as in Example 1 except that 3,4,5-methyl trihydroxybenzoate in the amount shown in Table 2 in place of potassium hydroquinone sulfonate was added to 100 g of the π conjugated conductive polymer solution A obtained in Preparation Example 3. The results are shown in Table 2.

TABLE 2

|  | Addition amount (g) | Electric conductivity (S/cm) |
|---|---|---|
| Example 11 | 0.1 | 802 |
|  | 0.3 | 840 |
|  | 0.4 | 1011 |
|  | 0.5 | 764 |
|  | 0.7 | 868 |
|  | 1.0 | 800 |
|  | 1.3 | 642 |
| Example 12 | 0.2 | 780 |
|  | 0.3 | 795 |
|  | 0.5 | 721 |
|  | 0.6 | 741 |
|  | 0.8 | 627 |
|  | 1.2 | 780 |
|  | 1.5 | 428 |

Example 12

A coating film of the conductive composition was similarly obtained and evaluated as in Example 1 except that 3,4,5-propyl trihydroxybenzoate in the amount shown in Table 2 in place of potassium hydroquinone sulfonate was added to 100 g of the π conjugated conductive polymer solution A obtained in Preparation Example 3. The results are shown in Table 2.

The conductive compositions of Examples 11 and 12 in which the hydroxy group-containing aromatic compound was represented by the formula (1) had higher conductivity.

Example 13

A coating film obtained by adding 0.3 mol of 3,4,5-methyl trihydroxybenzoate in Example 11 had been left for 550 hours in an oven of 150° C. The electric conductivity and retention rate of electric conductivity depending on heat of the heated coating film were evaluated. The results are shown in Table 3.

Example 14

A coating film obtained in Example 5 had been left for 550 hours in an oven of 150° C. The electric conductivity and retention rate of electric conductivity depending on heat of the heated coating film were evaluated. The results are shown in Table 3.

TABLE 3

|  | Electric conductivity (S/cm) | Retention rate of electric conductivity depending on heat (%) |
|---|---|---|
| Example 13 | 2259 | 84 |
| Example 14 | 2423 | 61 |

The conductive compositions of Examples 13 and 14 containing the hydroxy group-containing aromatic compound had high electric conductivity and retention rate of electric conductivity depending on heat. Comparative Example 13 and Example 14, it was found that the conductive composition of Example 13 in which the hydroxy group-containing aromatic compound was represented by the formula (1) had superior electric conductivity and higher retention rate of electric conductivity depending on heat.

Example 15

1.0 g of potassium hydroquinone sulfonate was added to 100 g of the π conjugated conductive polymer solution A obtained in Preparation Example 3 and the mixture was uniformly dispersed to obtain an antistatic coating material.

The obtained antistatic coating material was coated on a PET film having 25 μm thickness with a comma coater and dried to form an antistatic coating having about 0.1 μm thickness. Then, the surface resistance value of this antistatic coating was measured by a LORESTA (manufactured by Mitsubishi Chemical Corporation). Moreover, the visible light transmittance (JIS Z 8701) and haze (JIS K 6714) were measured. The results are shown in Table 4.

TABLE 4

|  | Surface resistance value (Ω) | Visible light transmittance (%) | Haze (%) |
|---|---|---|---|
| Example 15 | $4 \times 10^3$ | 94.5 | 2.2 |
| Example 16 | $5 \times 10^2$ | 93.4 | 2.3 |
| Example 17 | $6 \times 10^3$ | 95.2 | 1.9 |
| Example 18 | $3 \times 10^5$ | 95.8 | 1.6 |
| Example 19 | $6 \times 10^3$ | 92.8 | 2.8 |
| Example 20 | $3 \times 10^3$ | 93.7 | 2.4 |
| Example 21 | $9 \times 10^3$ | 95.1 | 2.1 |
| Example 22 | $6 \times 10^5$ | 83.1 | 3.2 |
| Example 23 | $2 \times 10^4$ | 84.4 | 3.0 |

TABLE 4-continued

| | Surface resistance value (Ω) | Visible light transmittance (%) | Haze (%) |
|---|---|---|---|
| Comparative Example 5 | 7 × 10$^5$ | 89.8 | 2.3 |
| Comparative Example 6 | 5 × 10$^5$ | 87.5 | 2.7 |
| Comparative Example 7 | 3 × 10$^8$ | 82.9 | 2.9 |

Example 16

An antistatic coating was similarly obtained and evaluated as in Example 15 except that 1.5 g of 1,2,3-trihydroxybenzene in place of potassium hydroquinone sulfonate of Example 15 was added to 100 g of the π conjugated conductive polymer solution A obtained in Preparation Example 3. The results are shown in Table 4.

Example 17

An antistatic coating was similarly obtained and evaluated as in Example 16 except that 10 g of an aqueous polyester solution of 25% by weight (brand name: PLAS COAT Z-561, manufactured by Goo Chemical Co., Ltd.) was further added to prepare an antistatic coating material. The results are shown in Table 4.

Example 18

An antistatic coating was similarly obtained and evaluated as in Example 17 except that 3 g of allylmethacrylate and 5 g of urethane-based acrylate (manufactured by Negami Chemical Industrial Co., Ltd.) were added in place of the aqueous polyester solution of Example 17 to prepare an antistatic coating material. The results are shown in Table 4.

Example 19

2.0 g of potassium hydroquinone sulfonate aqueous solution which was dissolved in 5 ml of water beforehand was added to 100 g of the π conjugated conductive polymer solution B obtained in Preparation Example 4 and the mixture was uniformly dispersed to prepare an antistatic coating material.

An antistatic coating was similarly obtained and evaluated as in Example 15 from the obtained antistatic coating material. The results are shown in Table 4.

Example 20

An antistatic coating was similarly obtained and evaluated as in Example 19 except that 1.5 g of 1,2,3-trihydroxybenzene in place of potassium hydroquinone sulfonate was added to 100 g of the π conjugated conductive polymer solution B obtained in Preparation Example 4. The results are shown in Table 4.

Example 21

An antistatic coating was similarly obtained and evaluated as in Example 20 except that 10 g of an aqueous polyester solution of 25% by weight (brand name: PLAS COAT Z-561, manufactured by Goo Chemical Co., Ltd.) was further added to prepare an antistatic coating material. The results are shown in Table 4.

Example 22

1.5 g of 1,2,3-trihydroxybenzene was added to 100 g of the π conjugated conductive polymer solution C obtained in Preparation Example 5 and the mixture was uniformly dispersed to obtain an antistatic coating material. An antistatic coating was similarly obtained and evaluated as in Example 15 from the obtained antistatic coating material. The results are shown in Table 4.

Example 23

An antistatic coating material was similarly obtained as in Example 15 except that 0.4 g of 3,4,5-methyltrihydroxybenzoate in place of potassium hydroquinone sulfonate was added to 100 g of the π conjugated conductive polymer solution A obtained in Preparation Example 3 and 10 g of an aqueous polyester solution of 25% by weight (brand name: PLAS COAT Z-561, manufactured by Goo Chemical Co., Ltd.) was further added. An antistatic coating was similarly obtained and evaluated as in Example 15 except that the obtained antistatic coating material was coated on a PET film having 200 μm thickness. The results are shown in Table 4.

Comparative Examples 5 to 7

The π conjugated conductive polymer solution A obtained in Preparation Example 3 (Comparative Example 5), the π conjugated conductive polymer solution B obtained in Preparation Example 4 (Comparative Example 6), and the π conjugated conductive polymer solution C obtained in Preparation Example 5 (Comparative Example 7) were coated on a glass and dried in an oven of 150° C. to form antistatic coatings. Electric characteristics of the antistatic coatings were evaluated as in Example 1. The results are shown in Table 4.

Antistatic coatings of Examples 15 to 23 each containing a hydroxy group-containing aromatic compound had high conductivity and also had superior heat stability and moisture stability. Especially, the antistatic coating of Example 23 in which the hydroxy group-containing aromatic compound was represented by the formula (1) had higher conductivity and stability.

On the other hand, antistatic coatings of Comparative Examples 5 to 7 each containing no hydroxy group-containing aromatic compound had low conductivity and also inferior heat stability and moisture stability.

Example 24

2.0 g of potassium hydroquinone sulfonate was added to 100 g of the π conjugated conductive polymer solution A and the mixture was uniformly dispersed to obtain a conductive polymer solution A'.

The obtained conductive polymer solution A' was coated on a glass and dried in an oven of 120° C. to form a coating film. The electric conductivity of the obtained coating film was measured by a LORESTA (manufactured by Mitsubishi Chemical Corporation). The results are shown in Table 5.

TABLE 5

|  | Electrostatic capacity (μF) | Electric Conductivity (S/cm) | ESR (mΩ) Initial | ESR (mΩ) 125° C., 500 hr |
|---|---|---|---|---|
| Example 27 (Example 24) | 473 | 252 | 12 | 14 |
| Example 28 (Example 25) | 469 | 634 | 8 | 10 |
| Example 29 (Example 26) | 438 | 764 | 8 | 9 |
| Example 30 (Example 24) | 563 | 252 | 9 | 10 |
| Example 31 (Example 25) | 585 | 634 | 6 | 7 |
| Comparative Example 8 | 484 | 2 | 57 | 795 |

Example 25

A conductive polymer solution B' was similarly obtained as in Example 24 except that 1.5 g of 1,2,3-trihydroxybenzene in place of potassium hydroquinone sulfonate was added to 100 g of the π conjugated conductive polymer solution A obtained in Preparation Example 3. The obtained conductive polymer solution B' was evaluated as in Example 24. The results are shown in Table 5.

Example 26

A conductive polymer solution C' was similarly obtained as in Example 24 except that 0.7 g of 3,4,5-methyltrihydroxybenzoate in place of potassium hydroquinone sulfonate was added to 100 g of the π conjugated conductive polymer solution A obtained in Preparation Example 3. The obtained conductive polymer solution C' was evaluated as in Example 24. The results are shown in Table 5.

Example 27

An anode lead terminal was connected to an etched aluminum foil (anode foil), then chemically reacted (oxidized) in a 10% by weight aqueous solution of ammonium adipate to form a dielectric layer at the aluminum surface and give a capacitor intermediate.

Next, the capacitor intermediate product and an opposite aluminum cathode foil welded with a cathode lead terminal were laminated, and the laminate was wound and taken as a capacitor element. At this time, a separator was inserted between the anode foil and the cathode foil of the capacitor intermediate.

A capacitor element was dipped in the conductive polymer solution A' prepared in Example 24 and then dried with a hot-air dryer of 120° C. to form a solid electrolyte layer at the surface of capacitor intermediate product on the dielectric side.

Subsequently, the capacitor element with formed solid electrolyte layer and an electrolyte which was a solution of 20% by weight of ammonium hydrogen adipate and 80% by weight of ethylene glycol were packed in an aluminum case and sealed with a sealing gum to prepare a capacitor.

The electrostatic capacity at 120 Hz, the initial value of equivalent series resistance (ESR) at 100 kHz and the ESR after 125° C. and 500 hours of the prepared capacitor were measured by LCZ meter 2345 (manufactured by NF Corporation). The results are shown in Table 5.

Example 28

A capacitor was similarly prepared and evaluated as in Example 27 except that conductive polymer solution B' was used in place of conductive polymer solution A'. The results are shown in Table 5.

Example 29

A capacitor was similarly prepared and evaluated as in Example 27 except that conductive polymer solution C' was used in place of conductive polymer solution A'. The results are shown in Table 5.

Example 30

An anode lead terminal was connected to an etched aluminum foil (anode foil), then chemically reacted (oxidized) in a 10% by weight aqueous solution of ammonium adipate to form a dielectric layer at the aluminum surface and give a capacitor intermediate product.

Next, the capacitor intermediate was dipped in the conductive polymer solution A' prepared in Example 24 and then dried with a hot-air dryer of 120° C. to form a solid electrolyte layer at the surface of capacitor intermediate product on the dielectric side.

Subsequently, a carbon paste was applied onto the formed solid electrolyte layer and dried with a hot-air dryer of 120° C., and then a silver paste was further applied to form a conductive layer and dried with a hot-air dryer of 120° C. to form a cathode.

A lead terminal was mounted to the cathode, then wound and taken as a capacitor element. At this time, a separator was inserted between the anode foil and the cathode foil of the capacitor intermediate product.

The capacitor element with formed solid electrolyte layer was packed in an aluminum case and sealed with a sealing gum to prepare a capacitor.

The electrostatic capacity at 120 Hz, the initial value of equivalent series resistance (ESR) at 100 kHz and the ESR after 125° C. and 500 hours of prepared capacitor were measured by LCZ meter 2345 (manufactured by NF Corporation).

Example 31

A capacitor was similarly prepared and evaluated as in Example 30 except that conductive polymer solution B' was used in place of conductive polymer solution A'. The results are shown in Table 5.

Comparative Example 8

A capacitor was similarly prepared and evaluated as in Example 27 except that the π conjugated conductive polymer solution A obtained in Preparation Example 3 was used as a conductive polymer solution. The results are shown in Table 5.

In each capacitor of Examples 27 to 31 in which a solid electrolyte layer of a cathode comprised a π conjugated conductive polymer, a polyanion, and a hydroxy group-containing aromatic compound, the cathode had excellent conductivity and low equivalent series resistance. Especially, the capacitor of Example 31 in which the hydroxy group-containing aromatic compound was represented by the formula (1) had excellent conductivity and low equivalent series resistance in the cathode.

On the other hand, a capacitor of Comparative Example 8 in which a solid electrolyte layer of a cathode comprised no hydroxy group-containing aromatic compound had low conductivity and high equivalent series resistance in the cathode.

Applications of the conductive composition of the present invention to various fields requiring the conductivity, such as conductive coating, antistatic agent, electromagnetic wave shielding agent, conductive material requiring transparency, battery material, capacitor material, conductive adhesive, sensor, electronic device material, semiconductor material, semiconductive material, electrostatic copying member, photosensitive member of printing, and the like, transfer body, intermediate point transfer body, conveying member, electrophotographic material, and the like can be expected.

The antistatic coating material of the present invention enables to prepare an antistatic coating having high conductivity, flexibility and adhesion base at a low cost because the antistatic coating can be formed by a simple method such as coating, and the like and display sufficient antistatic property in a small amount.

The capacitor of the present invention has low equivalent series resistance (ESR) and can be manufactured by a simple method.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An antistatic coating material comprising:
   a conductive composition comprising a π conjugated conductive polymer selected from the group consisting of substituted and unsubstituted polythiophenes and polypyrroles, a polyanion, a hydroxy group-containing aromatic compound selected from the group consisting of 1,2,3-trihydroxybenzene and 3,4,5-trihydroxybenzoate, and a dopant; and
   a solvent.

2. An antistatic coating produced by applying the antistatic coating material according to claim 1.

3. An antistatic film comprising a film base and the antistatic coating according to claim 2 on at least one side of the film base.

4. An optical filter comprising the antistatic coating according to claim 2.

5. An optical information recording medium comprising the antistatic coating according to claim 2.

* * * * *